United States Patent
Minisankar et al.

(10) Patent No.: US 11,796,993 B2
(45) Date of Patent: Oct. 24, 2023

(54) SYSTEMS, METHODS, AND DEVICES FOR EQUIPMENT MONITORING AND FAULT PREDICTION

(71) Applicant: Yokogawa Electric Corporation, Tokyo (JP)

(72) Inventors: Aparnadevi Minisankar, Bedok (SG); Kaushik Ghosh, Bedok (SG); Gokula Krishnan Sivaprakasam, Bedok (SG)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 27 days.

(21) Appl. No.: 17/371,404

(22) Filed: Jul. 9, 2021

(65) Prior Publication Data

US 2022/0365525 A1 Nov. 17, 2022

Related U.S. Application Data

(60) Provisional application No. 63/187,781, filed on May 12, 2021.

(51) Int. Cl.
*G05B 23/02* (2006.01)
*G06N 20/00* (2019.01)

(52) U.S. Cl.
CPC ..... *G05B 23/0283* (2013.01); *G05B 23/0281* (2013.01); *G06N 20/00* (2019.01)

(58) Field of Classification Search
CPC . G05B 23/0283; G05B 23/0281; G06N 20/00
See application file for complete search history.

(56) References Cited

U.S. PATENT DOCUMENTS 9,062,682 B2 6/2015 Loose et al.
9,934,671 B1 * 4/2018 Anderson ........... F16K 37/0041
(Continued)

FOREIGN PATENT DOCUMENTS

CN 110134571 A * 8/2019 .......... G01M 99/005
EP 3223095 9/2017
WO WO 2020/210227 10/2020

OTHER PUBLICATIONS

English machine translation of Li et al. (CN 110134571 A) (Year: 2019).*

(Continued)

*Primary Examiner* — Roy Y Yi
*Assistant Examiner* — Geoffrey T Evans
(74) *Attorney, Agent, or Firm* — Sheridan Ross P.C.

(57) ABSTRACT

Methods, systems, and devices for equipment monitoring and fault prediction are described, including: receiving measurement data associated with a set of equipment; providing at least a portion of the measurement data to a machine learning network; receiving an output from the machine learning network in response to the machine learning network processing at least the portion of the measurement data; and outputting a notification based on the output from the machine learning network, the notification including an indication of the predicted status. The processing of at least the portion of the measurement data may be based on a predictive model associated with the set of equipment. The output from the machine learning network may include a predicted status of the set of equipment.

20 Claims, 13 Drawing Sheets

(56) References Cited

U.S. PATENT DOCUMENTS

2019/0392351 A1  12/2019  Zuluaga et al.
2022/0004163 A1* 1/2022  Amihai .............. G05B 19/4065

OTHER PUBLICATIONS

Corne et al. "Comparing MCSA with vibration analysis in order to detect bearing faults—A case study," 2015 IEEE International Electric Machines & Drives Conference (IEMDC), 2015, pp. 1366-1372.
Devaney et al. "Preventing Failures By Mining Maintenance Logs With Case-Based Reasoning," 59th Meeting of the Society for Machinery Failure Prevention Technology (MFPT-59), 2005, 10 pages.
Guo et al. "Prediction of effluent concentration in a wastewater treatment plant using machine learning models," Journal of Environmental Sciences, 2015, vol. 32, pp. 90-101.
Inoue et al. "Anomaly Detection for a Water Treatment System Using Unsupervised Machine Learning," 2017 IEEE International Conference on Data Mining Workshops (ICDMW), Nov. 2017, pp. 1058-1065.
Marton et al. "Application of Data Driven Methods for Condition Monitoring Maintenance," Chemical Engineering Transactions, 2013, vol. 33, 6 pages.
Moran "How to Design a Process Control System," An Applied Guide to Process and Plant Design, 2015, Chapter 13, pp. 175-199.
Rayner "Chemical Process Pumps," Pump Users Handbook, 1995, 4th edition, pp. 263-281.

* cited by examiner

Fault tree based on job card history

SYSTEMS, METHODS, AND DEVICES FOR EQUIPMENT MONITORING AND FAULT PREDICTION

CROSS-REFERENCE TO RELATED APPLICATION

The present application claims the benefit of U.S. Provisional Application No. 63/187,781, filed May 12, 2021, the entire disclosure of which is hereby incorporated by reference, in its entirety, for all that it teaches and for all purposes.

FIELD OF TECHNOLOGY

The following relates to processing plants including equipment such as centrifugal pumps and positive displacement pumps, and more specifically, predicting faults associated with the equipment and recommending operator actions for mitigating the faults.

BACKGROUND

Some processing plants (e.g., petrochemical, water treatment, etc.) may incorporate rotating equipment such as centrifugal pumps and positive displacement pumps. In some cases, efficient operation of the equipment while mitigating equipment failure may ensure operational efficiency at a processing plant. Techniques for ensuring efficient operation while mitigating pump failure are desired. For example, at a water processing facility, efficient and fault-free operation of rotating equipment such as pumps may ensure a level of water quality output by the processing facility.

SUMMARY

The described techniques relate to improved methods, systems, devices, and apparatuses that support equipment monitoring and fault prediction. Generally, the described techniques provide for equipment monitoring and fault prediction associated with equipment (e.g., rotating equipment such as pumps) at a processing facility.

A method is described including: receiving measurement data associated with a set of equipment; providing at least a portion of the measurement data to a machine learning network; receiving an output from the machine learning network in response to the machine learning network processing at least the portion of the measurement data; and outputting a notification based on the output from the machine learning network, the notification including an indication of the predicted status. In some aspects, the processing of at least the portion of the measurement data may be based on a predictive model associated with the set of equipment. In some aspects, the output may include a predicted status of the set of equipment.

A device is described including: a processor; and a memory coupled with the processor, the memory storing data that, when executed by the processor, enables the processor to: receive measurement data associated with a set of equipment; provide at least a portion of the measurement data to a machine learning network; receive an output from the machine learning network in response to the machine learning network processing at least the portion of the measurement data; and output a notification based on the output from the machine learning network, the notification including an indication of the predicted status. In some aspects, the processing of at least the portion of the measurement data may be based on a predictive model associated with the set of equipment. In some aspects, the output may include a predicted status of the set of equipment.

A system is described including: a machine learning network; a processor; and a memory coupled with the processor, the memory storing data that, when executed by the processor, enables the processor to: receive measurement data associated with a set of equipment; provide at least a portion of the measurement data to a machine learning network; receive an output from the machine learning network in response to the machine learning network processing at least the portion of the measurement data; and output a notification based on the output from the machine learning network, the notification including an indication of the predicted status. In some aspects, the processing of at least the portion of the measurement data may be based on a predictive model associated with the set of equipment. In some aspects, the output may include a predicted status of the set of equipment.

DETAILED DESCRIPTION

Figure 1:
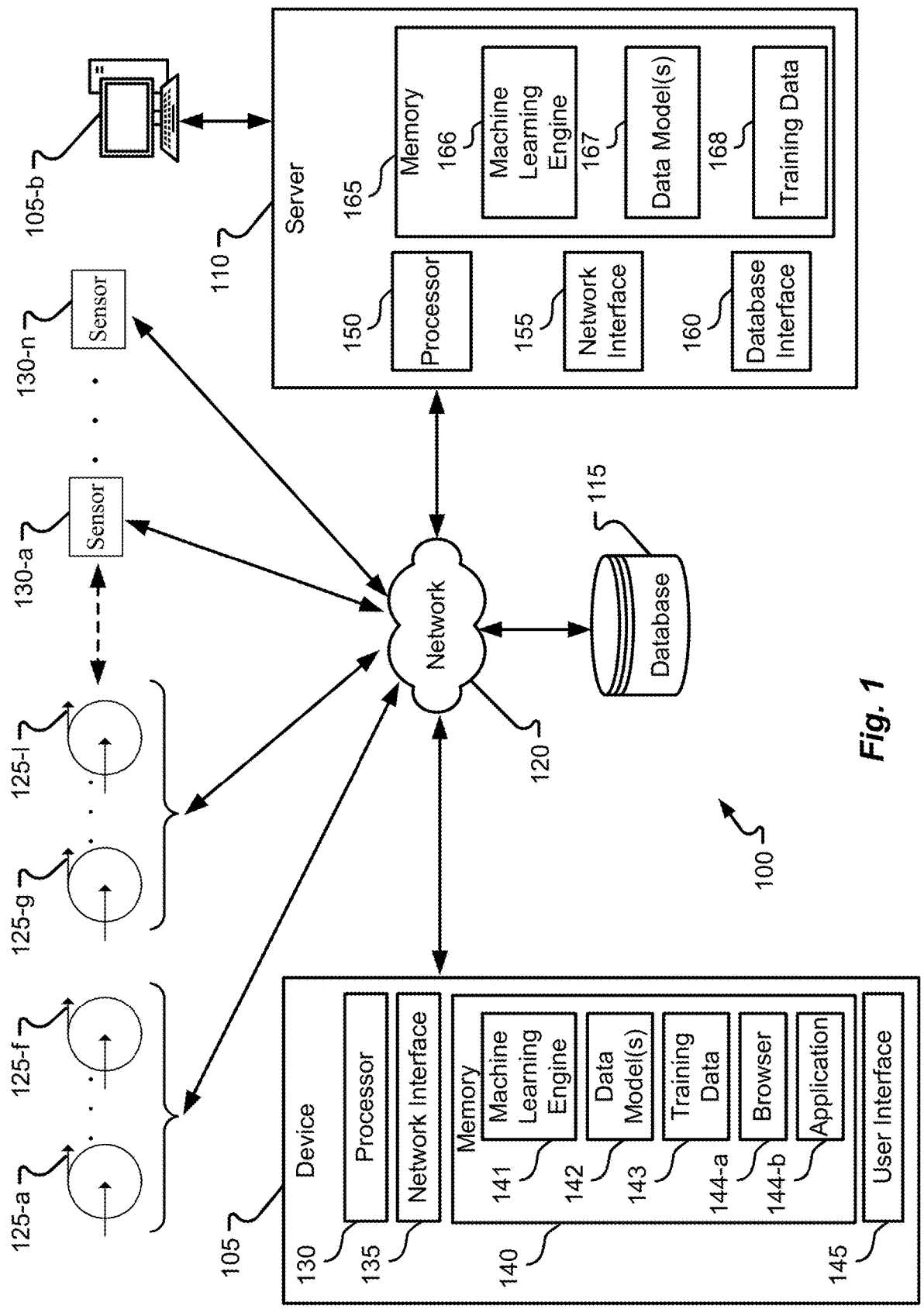
FIG. 1 illustrates an example of a system that supports equipment monitoring and fault prediction in accordance with aspects of the present disclosure.

In some processing facilities (e.g., petrochemical, refineries, power plants, water treatment plants), individual processes at a plant may use rotating equipment such as centrifugal pumps and positive displacement pumps. In some cases, efficient operation of the equipment while mitigating equipment faults may ensure operational efficiency at a processing facility. For example, some water treatment facilities employ multiple levels of treatment to produce potable water from raw water. In some cases, different stages or processes included in the water treatment process may include the use of rotating equipment such as centrifugal pumps and positive displacement pumps.

Centrifugal pumps deliver water from a point (e.g., a tank) in a water treatment facility to discharge pipes or other points (e.g., tanks) within the facility. Positive displacement pumps make liquid (e.g., chemical liquids, water, etc.) move by trapping a fixed volume of the liquid and forcing (displacing) the trapped volume into a discharge piping. Techniques for ensuring efficient operation of equipment while mitigating pump failure are described herein.

According to example aspects of the present disclosure, an efficient fault detection and predictive maintenance algorithm is described which may reduce downtime associated future catastrophic failures due to faulty equipment. In some aspects, the algorithm may support the monitoring and comparison of performance parameters among similar types of equipment (e.g., pumps, pumps of a similar pump type). In some examples, the algorithm may support operator selection of a pump or combination of pumps based on ranking information (e.g., highest ranked pump(s) according to performance) with respect to performance demand or criteria.

Aspects of the present disclosure include combining operational data (e.g., historical operation data) of a processing facility with machine learning techniques. In an example, aspects described herein include optimizing equipment operation based on an analysis by machine learning elements (e.g., a machine learning network). For example, the present disclosure may support utilizing process data to build a predictive model associated with equipment performance/operation under a set of conditions (e.g., normal operating conditions, also referred to herein as a base set of operating conditions, baseline operating conditions, and/or a stable period of operating conditions). In some aspects, the techniques described herein may include querying the predictive model with online operational data (also referred to herein as online process data) to preemptively identify faults early enough to apply changes or corrections to equipment configurations and/or equipment operation. Equipment configurations may include, for example, a configuration of pump parameters (e.g. flow rate), setting of pump parameter values, a configuration of selected pumps, etc. Equipment operation may refer to an operational state of an equipment.

In some cases, based on processing the operational data, the predictive model may quantify the extent of a failure (e.g., an actual failure, a predicted failure) and remaining useful life of equipment. The techniques described herein may provide increased efficiency and reduced overhead (e.g., reduced complexity) compared to other techniques for modeling the performance of processing facilities, such as with respect to pump operations. For example, some other techniques may focus on output or quality (e.g., water treatment quality) at a processing facility, which may be inefficient and complex.

Aspects of the present disclosure may support effective and accurate diagnoses and corrective actions through data-driven methods complemented by domain knowledge. For example, aspects of the present disclosure may support machine learning of operational patterns (e.g., previous operational patterns) of equipment based on historical maintenance logs and collective knowledge of equipment operators. In some cases, maintenance logs may include information about faults, root causes, and repairs carried out on equipment over the lifetime of the equipment.

The historical maintenance logs and collective knowledge of equipment operators may be included in unstructured data obtained from different data sources. In some aspects, a system (e.g., a server) associated with a processing facility may apply machine learning algorithms to combine and utilize such unstructured data. In an example, the system (e.g., the server) may support building a database or library of such unstructured data knowledge and apply text analytics-based techniques to identify potential (e.g., based on probability) root causes and corresponding resolutions for any identified fault(s) or predicted fault(s) associated with the equipment.

In some aspects, the machine learning-based techniques described herein may utilize data logs (e.g., routine data logs such as process and maintenance data) and may refrain from monitoring of additional parameters. For example, using the techniques described herein, a system (e.g., server) may apply data-driven analysis that integrates multiple sources of data (e.g., multiple sources of historical data and/or online processing data), improving operational efficiency of a processing facility. Examples of aspects described herein may provide improved equipment monitoring, equipment configuration, equipment fault prediction, and equipment fault resolution at a processing facility compared to other condition monitoring techniques such as motor current signature analysis (MCSA) and vibration analysis. For example, MCSA and vibration analysis focus on online monitoring of parameters such as vibration, acoustical noise, stator current, etc. to capture evolving faults.

Aspects of the disclosure are initially described in the context of a processing facility such as a water treatment facility including rotating equipment (e.g., centrifugal pumps, positive displacement pumps, etc.). Examples of processes that support equipment monitoring and fault prediction are then described. Aspects of the disclosure are further illustrated by and described with reference to apparatus diagrams, system diagrams, and flowcharts that relate to equipment monitoring and fault prediction.

FIG. 1 illustrates an example of a system 100 that supports equipment monitoring and fault prediction in accordance with aspects of the present disclosure. In some examples, the system 100 may be a process control system applicable for process control within an industrial environment such as a processing facility.

In some aspects, the system 100 may be a distributed process control system capable of executing and controlling processes associated with manufacturing, conversion, production, other processing (e.g., petrochemical, refineries, power plants, water treatment, etc.), or the like. In some examples, the system 100 may be a distributed process control system including controllers (e.g., implemented by a communication device 105 and/or a server 110) connected to equipment 125 included in the system 100.

The system 100 may include a communication device 105 (or multiple communication devices 105), a server 110, a database 115, a communication network 120, equipment 125, and sensor devices 130. The communication device 105 may be a wireless communication device. Non-limiting examples of the communication device 105 may include, for example, personal computing devices or mobile computing devices (e.g., laptop computers, mobile phones, smart phones, smart devices, wearable devices, tablets, etc.). In some examples, the communication device 105 may be operable by or carried by a human user. In some aspects, the communication device 105 may perform one or more operations autonomously or in combination with an input by the user, the communication device 105, and/or the server 110.

The server 110 may be, for example, a cloud-based server. In some aspects, the server 110 may be a local server connected to the same network (e.g., LAN, WAN) associated with the communication device 105. The database 115 may be, for example, a cloud-based database. In some aspects, the database 115 may be a local database connected to the same network (e.g., LAN, WAN) associated with the communication device 105 and/or the server 110. The database 115 may be supportive of data analytics, machine learning, and AI processing.

The communication network 120 may facilitate machine-to-machine communications between any of the communication device 105 (or multiple communication device 105), the server 110, or one or more databases (e.g., database 115). The communication network 120 may include any type of known communication medium or collection of communication media and may use any type of protocols to transport messages between endpoints. The communication network 120 may include wired communications technologies, wireless communications technologies, or any combination thereof.

The Internet is an example of the communication network 120 that constitutes an Internet Protocol (IP) network consisting of multiple computers, computing networks, and other communication devices located in multiple locations, and components in the communication network 120 (e.g., computers, computing networks, communication devices) may be connected through one or more telephone systems and other means. Other examples of the communication network 120 may include, without limitation, a standard Plain Old Telephone System (POTS), an Integrated Services Digital Network (ISDN), the Public Switched Telephone Network (PSTN), a Local Area Network (LAN), a Wide Area Network (WAN), a wireless LAN (WLAN), a Session Initiation Protocol (SIP) network, a Voice over Internet Protocol (VoIP) network, a cellular network, and any other type of packet-switched or circuit-switched network known in the art. In some cases, the communication network 120 may include of any combination of networks or network types. In some aspects, the communication network 120 may include any combination of communication mediums such as coaxial cable, copper cable/wire, fiber-optic cable, or antennas for communicating data (e.g., transmitting/receiving data).

The equipment 125 (e.g., equipment 125-a through equipment 125-l) may include any equipment associated with a processing facility. For example, the equipment 125 (e.g., equipment 125-a through equipment 125-f) may include rotating equipment such as positive displacement pumps. In another example, the equipment 125 (e.g., equipment 125-g through equipment 125-l) may include rotating equipment such as centrifugal pumps.

The sensor devices 130 (e.g., sensor device 130-a through sensor device 130-n) may include field devices capable of monitoring or measuring the performance (e.g., measuring performance data) associated with the equipment 125. In an example, the sensor devices 130 may include flow sensors, pressure sensors, level sensors, temperature sensors, etc. In some cases, the sensor devices 130 may be mechanically coupled to the equipment 125.

The sensor devices 130 may be, for example, communication devices capable of transmitting and receiving signals (e.g., via wired or wireless communications). For example, each sensor device 130 may be capable of transmitting any measured performance data (i.e., measurement data) to a communication device 105, the database 115, and/or the server 110, for example, via the communications network 120. In some cases, a sensor device 130 may transmit measurement data directly to a communication device 105 (e.g., via a radio frequency (RF) communications link established between the sensor device 130 and the communication device 105, via a wired communication link between the sensor device 130 and the communication device 105, etc.), and the communication device 105 may store the measurement data to the database 115 and/or transmit the measurement data to the server 110.

In some aspects, the equipment 125 may include equipment of different types (e.g., positive displacement pumps, centrifugal pumps), and the equipment 125 may operate in groups based on equipment type, such as centrifugal pumps. For example, equipment 125-a through equipment 125-f may each be a positive displacement pump, and equipment 125-a through equipment 125-f may operate in a group of positive displacement pumps. In another example, equipment 125-g through equipment 125-l may each be a centrifugal pump, and equipment 125-g through equipment 125-l may operate in a group of centrifugal pumps.

In some cases, equipment 125-a through equipment 125-f may operate in the same group, and two or more of equipment 125-a through equipment 125-f may be in operation at a time based on performance demand and/or scheduling (e.g., shift). In some other cases, equipment 125-g through equipment 125-i may operate in the same group, and two or more of equipment 125-g through equipment 125-i may be in operation at a time based on performance demand and/or scheduling (e.g., shift).

Various sensor device configurations may be implemented in accordance with aspects of the present disclosure. For example, some sensor devices 130 (e.g., flow meter, pressure meter) may measure parameters corresponding to individual equipment 125 (e.g., equipment 125-a) or group of equipment 125 (e.g., equipment 125-a through equipment 125-f).

In another example, some sensor devices 130 may measure parameters corresponding to individual equipment 125. For example, a sensor device 130-a may measure speed or stroke control of equipment 125-a (e.g., an individual positive displacement pump). According to example aspects of the present disclosure, the system 100 may support predictive modeling of equipment operation (e.g., pump operation) based on such various sensor configurations (e.g., individual measurements derived from a respective tag associated with individual equipment, group measurements derived from respective tags associated with a group of equipment).

In various aspects, settings of the any of the communication devices 105, the server 110, database 115, the communication network 120, the equipment 125, and the sensor devices 130 may be configured and modified by any user and/or administrator of the system 100. Settings may include thresholds or parameters described herein, as well as settings related to how data is managed. Settings may be configured to be personalized for one or more communication devices 105, users of the communication devices 105, and/or other groups of entities, and may be referred to herein as profile settings, user settings, or organization settings. In some aspects, rules and settings may be used in addition to, or instead of, parameters or thresholds described herein. In some examples, the rules and/or settings may be personalized by a user and/or administrator for any variable, threshold, user (user profile), communication device 105, entity, or groups thereof.

Aspects of the communication devices 105 and the server 110 are further described herein. A communication device 105 (e.g., communication device 105-*a*) may include a processor 130, a network interface 135, a memory 140, and a user interface 145. In some examples, components of the communication device 105 (e.g., processor 130, network interface 135, memory 140, user interface 145) may communicate over a system bus (e.g., control busses, address busses, data busses) included in the communication device 105. In some cases, the communication device 105 may be referred to as a computing resource.

In some cases, the communication device 105 may transmit or receive packets to one or more other devices (e.g., another communication device 105, the server 110, the database 115, equipment 125, a sensor device 130) via the communication network 120, using the network interface 135. The network interface 135 may include, for example, any combination of network interface cards (NICs), network ports, associated drivers, or the like. Communications between components (e.g., processor 130, memory 140) of the communication device 105 and one or more other devices (e.g., another communication device 105, the database 115, equipment 125, a sensor device 130) connected to the communication network 120 may, for example, flow through the network interface 135.

The processor 130 may correspond to one or many computer processing devices. For example, the processor 130 may include a silicon chip, such as a FPGA, an ASIC, any other type of IC chip, a collection of IC chips, or the like. In some aspects, the processors may include a microprocessor, CPU, a GPU, or plurality of microprocessors configured to execute the instructions sets stored in a corresponding memory (e.g., memory 140 of the communication device 105). For example, upon executing the instruction sets stored in memory 140, the processor 130 may enable or perform one or more functions of the communication device 105.

The memory 140 may include one or multiple computer memory devices. The memory 140 may include, for example, Random Access Memory (RAM) devices, Read Only Memory (ROM) devices, flash memory devices, magnetic disk storage media, optical storage media, solid-state storage devices, core memory, buffer memory devices, combinations thereof, and the like. The memory 140, in some examples, may correspond to a computer-readable storage media. In some aspects, the memory 140 may be internal or external to the communication device 105.

The processor 130 may utilize data stored in the memory 140 as a neural network (also referred to herein as a machine learning network). The neural network may include a machine learning architecture. In some aspects, the neural network may be or include an artificial neural network (ANN). In some other aspects, the neural network may be or include any machine learning network such as, for example, a deep learning network, a convolutional neural network, or the like. Some elements stored in memory 140 may be described as or referred to as instructions or instruction sets, and some functions of the communication device 105 may be implemented using machine learning techniques.

The memory 140 may be configured to store instruction sets, neural networks, and other data structures (e.g., depicted herein) in addition to temporarily storing data for the processor 130 to execute various types of routines or functions. For example, the memory 140 may be configured to store program instructions (instruction sets) that are executable by the processor 130 and provide functionality of machine learning engine 141 described herein. The memory 140 may also be configured to store data or information that is useable or capable of being called by the instructions stored in memory 140. One example of data that may be stored in memory 140 for use by components thereof is a data model(s) 142 (e.g., a neural network model or other model described herein) and/or training data 143 (also referred to herein as a training data and feedback).

The machine learning engine 141 may include a single or multiple engines. The communication device 105 (e.g., the machine learning engine 141) may utilize one or more data models 142 for recognizing and processing information obtained from other communication devices 105, the server 110, equipment 125, sensor devices 130, and the database 115. In some aspects, the communication device 105 (e.g., the machine learning engine 141) may update one or more data models 142 based on learned information included in the training data 143. In some aspects, the machine learning engine 141 and the data models 142 may support forward learning based on the training data 143. The machine learning engine 141 may have access to and use one or more data models 142.

The data model(s) 142 may be built and updated by the machine learning engine 141 based on the training data 143. The data model(s) 142 may be provided in any number of formats or forms. Non-limiting examples of the data model(s) 142 include Decision Trees, Support Vector Machines (SVMs), Nearest Neighbor, and/or Bayesian classifiers. In some aspects, the data model(s) 142 may include a predictive model such as an autoregressive model. Other example aspects of the data model(s) 142, such as generating (e.g., building, training) and applying the data model(s) 142, are described with reference to the figure descriptions herein.

Figure 2:
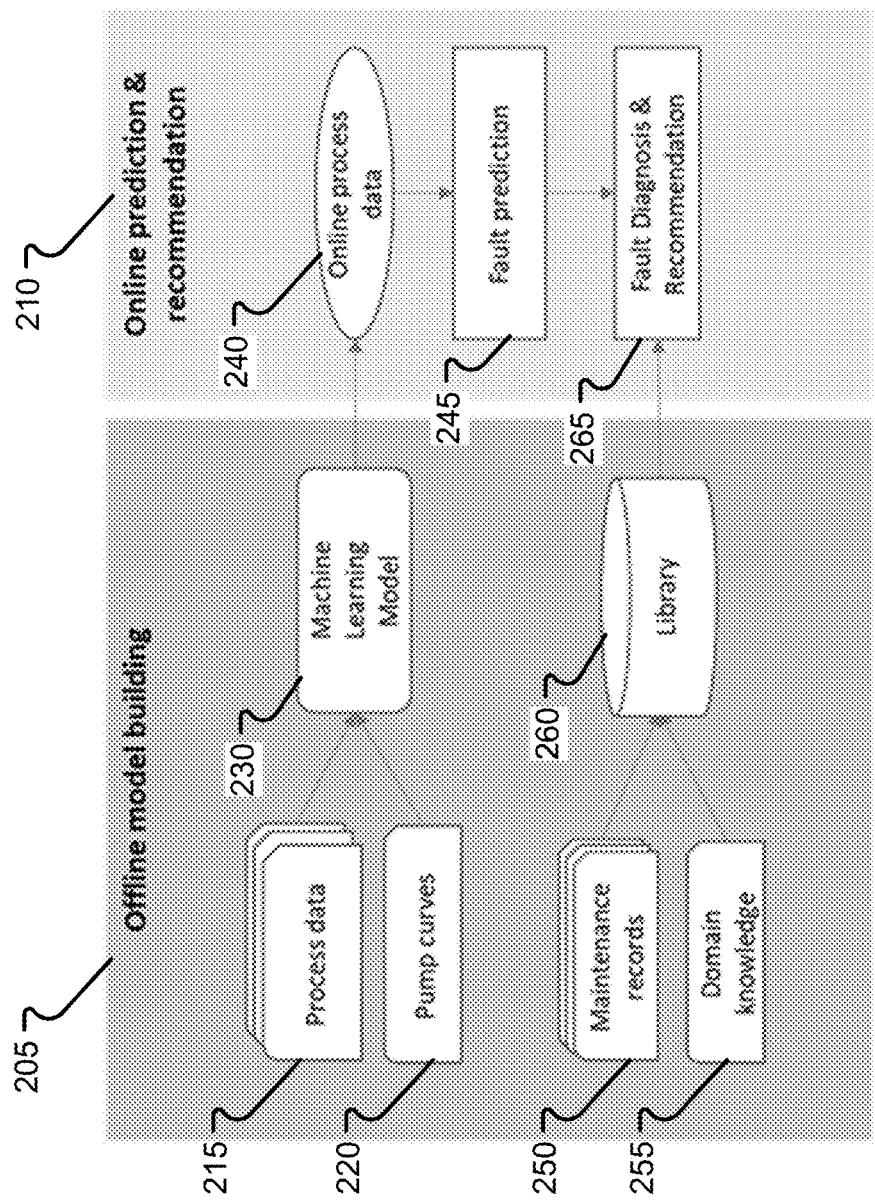
FIG. 2 illustrates an example of a process flow that supports equipment monitoring and fault prediction in accordance with aspects of the present disclosure.
Figure 3:
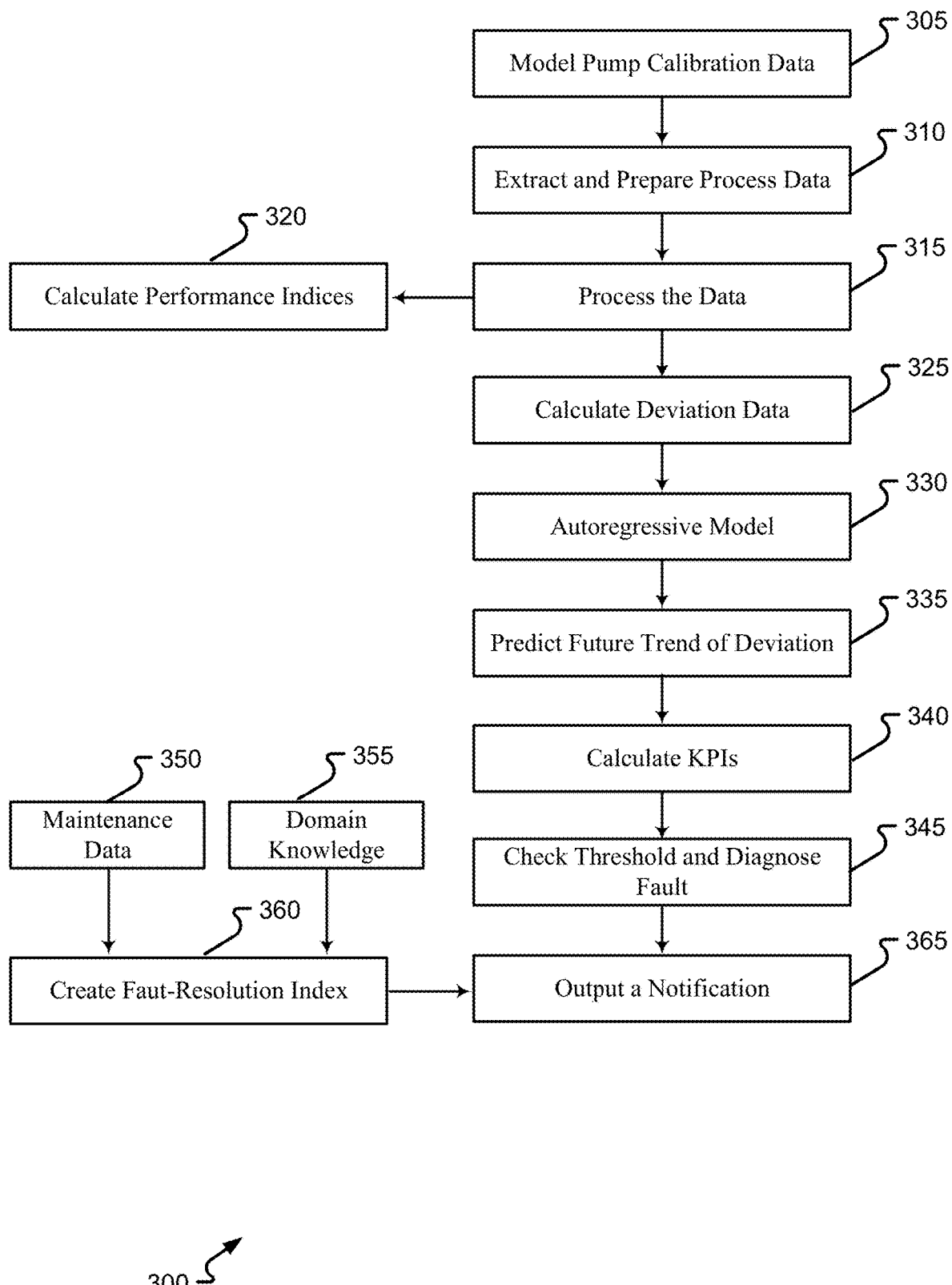
FIG. 3 illustrates an example of a process flow that supports equipment monitoring and fault prediction in accordance with aspects of the present disclosure.

According to aspects of the present disclosure, the data model(s) 142 may include a first type of data model 142 (e.g., a baseline model or a stable period model) and a second type of data model 142 (e.g., an autoregressive model), examples of which are at least described herein with reference to FIGS. 2 and 3.

In some examples, the training data 143 may include aggregated measurement data (e.g., current measurement values, previous measurement values) recorded by the sensor devices 130. In some aspects, the aggregated measurement data may include measurement data recorded with respect to one or more temporal periods and/or one or more parameters (e.g., performance parameters) associated with the equipment 125.

In some cases, the training data 143 may include performance data predicted by the machine learning engine 141 (i.e., supportive of forward learning). The predicted performance data may include, for example, predicted faults associated with the equipment 125, temporal information (e.g., predicted temporal instances, predicted temporal durations, etc.) associated with the predicted faults, causal information associated with the predicted faults, or the like.

In some cases, the predicted performance data may include predicted values (e.g., predicted flow rate, predicted rotational speed, etc.) corresponding to the parameters associated with the equipment 125. In some examples, the predicted performance data may include deviation values (also referred to herein as a deviation magnitude) between the predicted values and a threshold value. For example, the deviation values may include deviation magnitudes by which the predicted values exceed the threshold value.

In some other examples, the predicted performance data may include, for a parameter(s) associated with the equipment 125, a quantity of predicted values exceeding the threshold value, and the machine learning engine 141 may determine a predicted status (e.g., predicted fault) of the equipment 125 based on whether the quantity of predicted values exceeding the threshold value exceeds a threshold quantity. For example, the machine learning engine 141 may determine a predicted status (e.g., predicted fault) of the equipment 125 based on whether a quantity of consecutive predicted values exceeding the threshold value exceeds a threshold quantity. In some cases, instances of predicted values exceeding the threshold value may be referred herein as threshold breaches.

In some other examples, the training data 143 may include parameters and/or configurations of equipment 125 (e.g., location, configuration, flow rate, rotational speed, etc.). In some aspects, the training data 143 may include reference data of the equipment 125, such as calibration data (e.g., performance curves) of the equipment 125, operator actions with respect to different statuses (e.g., different types of faults) of the equipment 125, and/or maintenance data (e.g., maintenance records) of the equipment 125.

In some cases, the reference data may include reference performance data associated with the equipment 125 with respect to set of operating conditions and a temporal period (e.g., a reference period). In an example, the operating conditions may include normal operating conditions (also referred to herein as a stable period or baseline conditions) with respect to the system 100 and/or the equipment 125.

The training data 143 may include parameters and/or configurations of a sensor device 130 (e.g., location, orientation, settings, etc.) as described herein. Other example aspects of the training data 143 are described with reference to FIG. 2.

The machine learning engine 141 may be configured to analyze aggregated measurement information (e.g., measurement values) associated with the equipment 125. In some examples, the equipment 125 may include a positive displacement pump or a centrifugal pump, and the measurement information may include measured values corresponding to parameters such as flow rate, rotational speed, stroke length, pressure capability (e.g., pump head), or the like. In some cases, the measurement information may include measured values corresponding to at least two of the parameters (e.g., flow rate and rotational speed).

According to example aspects of the present disclosure, the machine learning engine 141 may calculate the predicted performance data (e.g., predicted faults, predicted performance values, etc.) of the equipment 125 based on deviation values between current measurement values and a threshold value. In some cases, the machine learning engine 141 may calculate the predicted performance data based on deviation values between previous measurement values (e.g., historical information) and the threshold value.

In some other aspects, the machine learning engine 141 may be configured to analyze the performance data (e.g., flow rate, rotational speed, etc.) predicted by the machine learning engine 141 (i.e., supportive of forward learning).

For example, the machine learning engine 141 may analyze the deviation values (also referred to herein as a deviation magnitude) between the predicted values and a threshold value. In another example, the machine learning engine 141 may analyze instances of predicted values exceeding the threshold value. For example, the machine learning engine 141 may identify instances in which the quantity of consecutive predicted values that exceed the threshold value is greater than or equal to a quantity threshold value.

As will be described herein in further detail with reference to FIGS. 2 and 3, the machine learning engine 141 may predict statuses (e.g., faults) associated with the equipment 125 based on prediction key performance indicators (KPIs) (also referred to herein as prediction KPIs) associated with the predicted performance data.

In an example aspect, a first KPI may include criteria such as a quantity of consecutive predicted values exceeding a threshold value (e.g., a quantity of consecutive predicted flow rates exceeding a predicted flow rate). For example, the machine learning engine 141 may predict a fault associated with the equipment 125 based on whether the first KPI is reaching or exceeding the threshold value. In an example, the machine learning engine 141 may predict a fault associated with the equipment 125 based on whether the quantity of consecutive predicted values is greater than or equal to a quantity threshold.

In another example aspect, a second KPI may include criteria such as a deviation value percentage (also referred to herein as a deviation magnitude percentage). For example, the deviation value percentage may be a percentage difference between a predicted value and a threshold value (e.g., a percentage difference between a predicted flow rate and a threshold flow rate). In an example, the machine learning engine 141 may predict a fault associated with the equipment 125 based on whether the deviation value percentage is greater than or equal to a threshold deviation value percentage.

The machine learning engine 141 may analyze any information (e.g., measured performance data, predicted performance data, parameters, and/or configurations) described herein that is historical or in real-time. The machine learning engine 141 may be configured to receive or access information from the communication device 105, the server 110, the database 115, the equipment 125, and/or the sensor devices 130. The machine learning engine 141 may build any number of profiles such as, for example, profiles associated with the system 100 (e.g., profiles associated with a processing facility), profiles associated with equipment 125, profiles associated with a sensor device 130, etc. using automatic processing, using artificial intelligence and/or using input from one or more users associated with the communication device 105. The profiles may be, for example, configuration profiles, performance profiles, etc. The machine learning engine 141 may use automatic processing, artificial intelligence, and/or inputs from one or more users of the communication devices 105 to determine, manage, and/or combine information relevant to a configuration profile.

The machine learning engine 141 may determine configuration profile information based on a user's interactions with information. The machine learning engine 141 may update (e.g., continuously, periodically) configuration profiles based on new information that is relevant. The machine learning engine 141 may receive new information from any communication device 105, the server 110, the database 115, the equipment 125, the sensor devices 130, etc. Profile information may be organized and classified in various manners. In some aspects, the organization and classification of configuration profile information may be determined by automatic processing, by artificial intelligence and/or by one or more users of the communication devices 105.

The machine learning engine 141 may create, select, and execute appropriate processing decisions. Example processing decisions may include analysis of measured performance data, predicted performance data, configuration of a communication device 105, configuration of equipment 125, and/or configuration of a sensor device 130. Processing decisions may be handled automatically by the machine learning engine 141, with or without human input.

The machine learning engine 141 may store, in the memory 140 (e.g., in a database included in the memory 140), historical information (e.g., reference data, measurement data, predicted performance data, deviation values, configurations, etc.). Data within the database of the memory 140 may be updated, revised, edited, or deleted by the machine learning engine 141. In some aspects, the machine learning engine 141 may support continuous, periodic, and/or batch fetching of data (e.g., from equipment 125, sensor devices 130, a central controller, communication devices 105, etc.) and data aggregation.

The communication device 105 may render a presentation (e.g., visually, audibly, using haptic feedback, etc.) of an application 144 (e.g., a browser application 144-a, an application 144-b). The application 144-b may be an application associated with executing, controlling, and/or monitoring equipment 125 of the system 100 as described herein. For example, the application 144-b may enable control of the communication device 105, equipment 125, and/or sensor devices 130 described herein.

In an example, the communication device 105 may render the presentation via the user interface 145. The user interface 145 may include, for example, a display (e.g., a touchscreen display), an audio output device (e.g., a speaker, a headphone connector), or any combination thereof. In some aspects, the applications 144 may be stored on the memory 140. In some cases, the applications 144 may include cloud-based applications or server-based applications (e.g., supported and/or hosted by the database 115 or the server 110). Settings of the user interface 145 may be partially or entirely customizable and may be managed by one or more users, by automatic processing, and/or by artificial intelligence.

In an example, any of the applications 144 (e.g., browser application 144-a, application 144-b) may be configured to receive data in an electronic format and present content of data via the user interface 145. For example, the applications 144 may receive data from another communication device 105, the server 110, the database 115, equipment 125, and/or sensor devices 130 via the communications network 120, and the communication device 105 may display the content via the user interface 145.

The database 115 may include a relational database, a centralized database, a distributed database, an operational database, a hierarchical database, a network database, an object-oriented database, a graph database, a NoSQL (non-relational) database, etc. In some aspects, the database 115 may store and provide access to, for example, any of the stored data described herein.

The server 110 may include a processor 150, a network interface 155, database interface instructions 160, and a memory 165. In some examples, components of the server 110 (e.g., processor 150, network interface 155, database interface 160, memory 165) may communicate over a system bus (e.g., control busses, address busses, data busses) included in the server 110. The processor 150, network interface 155, and memory 165 of the server 110 may include examples of aspects of the processor 130, network interface 135, and memory 140 of the communication device 105 described herein.

For example, the processor 150 may be configured to execute instruction sets stored in memory 165, upon which the processor 150 may enable or perform one or more functions of the server 110. In some examples, the server 110 may transmit or receive packets to one or more other devices (e.g., a communication device 105, the database 115, another server 110) via the communication network 120, using the network interface 155. Communications between components (e.g., processor 150, memory 165) of the server 110 and one or more other devices (e.g., a communication device 105, the database 115, equipment 125, a sensor device 130, etc.) connected to the communication network 120 may, for example, flow through the network interface 155.

In some examples, the database interface instructions 160 (also referred to herein as database interface 160), when executed by the processor 150, may enable the server 110 to send data to and receive data from the database 115. For example, the database interface instructions 160, when executed by the processor 150, may enable the server 110 to generate database queries, provide one or more interfaces for system administrators to define database queries, transmit database queries to one or more databases (e.g., database 115), receive responses to database queries, access data associated with the database queries, and format responses received from the databases for processing by other components of the server 110.

The memory 165 may be configured to store instruction sets, neural networks, and other data structures (e.g., depicted herein) in addition to temporarily storing data for the processor 150 to execute various types of routines or functions. For example, the memory 165 may be configured to store program instructions (instruction sets) that are executable by the processor 150 and provide functionality of a machine learning engine 166. One example of data that may be stored in memory 165 for use by components thereof is a data model(s) 167 (e.g., any data model described herein, a neural network model, etc.) and/or training data 168.

The data model(s) 167 and the training data 168 may include examples of aspects of the data model(s) 142 and the training data 143 described with reference to the communication device 105. The machine learning engine 166 may include examples of aspects of the machine learning engine 141 described with reference to the communication device 105. For example, the server 110 (e.g., the machine learning engine 166) may utilize one or more data models 167 for recognizing and processing information obtained from communication devices 105, another server 110, the database 115, the equipment 125, and/or the sensor devices 130. In some aspects, the server 110 (e.g., the machine learning engine 166) may update one or more data models 167 based on learned information included in the training data 168.

In some aspects, components of the machine learning engine 166 may be provided in a separate machine learning engine in communication with the server 110.

Example aspects of the present disclosure may include applying advances in data storage technologies (e.g., implemented at the memory 140, database 115, and/or memory 165) with smart sensors (e.g., sensor devices 130) to capture and store all the relevant data pertaining to any equipment/process. For example, the techniques described herein may include applying one or more mechanisms to extract actionable insight (e.g., fault prediction, fault diagnosis and analysis, etc.) from the data and provide situational recommendations (e.g., recommended operator actions, recommended maintenance actions) based on the extracted insight. Aspects described herein support a situational recommendation system (e.g., system 100) that overcomes drawbacks associated with other data storage solutions in which a correlation among data cannot be determined. For example, in some other data storage solutions, factors such as fragmented and siloed data, relatively large volumes of stored data, a myriad variety of stored data, and the like may contribute to difficulties (e.g., experienced by users) in finding insights or correlations among the data.

The data model(s) 142 may include non-linear, self-learning and dynamic data based models for continuous monitoring of equipment 125 for the early detection and diagnosis of failures. Aspects of the present disclosure may support building and/or training a data model(s) 142 using machine learning techniques that are able to capture operational variations contained in the dataset without human intervention. For example, Aspects of the present disclosure support building a data model(s) 142 using process data associated with operational variations (e.g., normal, faulty) associated with equipment 125 and the system 100. In some cases, the operational variations may be identified based on information provided by domain experts (e.g., experienced operators of the system 100, the equipment 125, and/or the sensor devices 130).

In an example, the data model(s) 142 may be trained or may learn during a training phase about patterns in the dataset for identifying different fault types. In some aspects, the data model(s) 142 as trained may be deployed to predict equipment statuses based on available data. In an example, for equipment 125 (e.g., rotating equipment) included in the system 100 (e.g., a processing facility), the system 100 and/or communication devices 105 may notify maintenance engineers of root causes associated with a predicted fault and/or and recommendations (e.g., operator actions, maintenance actions) for addressing the predicted fault, by monitoring the data using the data model(s) 142 and identified problematic "fingerprints."

Aspects of the subject matter described herein may be implemented to realize one or more advantages. The described techniques may support example improvements in early fault detection, root cause identification, and/or resolution recommendation with respect to equipment 125 in a system 100. For example, aspects described herein may include analyzing multiple sources of data to provide a comprehensive solution with early prediction and resolution suggestions.

FIG. 2 illustrates a process flow 200 that supports equipment monitoring and fault prediction in accordance with aspects of the present disclosure. In some examples, the process flow 200 may implement aspects of system 100. For example, the process flow 200 may be implemented by a server 110 and/or a communication device 105 described with reference to FIG. 1.

In the following description of the process flow 200, the operations may be performed in a different order than the order shown, or the operations may be performed in different orders or at different times. Certain operations may also be left out of the process flow 200, or other operations may be added to the process flow 200. It is to be understood that while a server 110 is described as performing a number of the operations of process flow 200, any device (e.g., another server 110, a communication device 105) may perform the operations shown.

The system 100 may be a machine-learning based early fault detection & diagnosis system supportive of monitoring equipment 125 (e.g., rotating equipment) in operation, detecting a fault at initiation, pinpointing root cause information, and outputting alerts for corrective maintenance with suggested remedial actions. For example, the system 100 may support offline model building at 205 and online prediction and recommendation at 210.

A server 110 may build a machine learning model 230 (also referred to herein as a baseline model or a stable period model) of equipment performance for equipment 125 under normal operating conditions (also referred to herein as stable period of operation) of the system 100 and/or the equipment 125. For example, the server 110 may build the machine learning model 230 based on process data 215 and performance curve data 220 (also referred to herein as 'pump curves 220' in an example in which the equipment 125 includes a pump, also referred to as equipment design data applicable to any equipment 125). In an example in which the equipment 125 includes rotating equipment such as a pump (e.g., a positive displacement pump, a centrifugal pump), the performance curve data 220 may include pump curves associated with normal operating conditions.

The process data 215 may be referred to herein as reference period data based on which the machine learning model 230 may be built or rebuilt by the server 110. The process data 215 and performance curve data 220 may be examples of training data 143 described with reference to FIG. 1. The machine learning model 230 may include examples of aspects of a data model(s) 142 described with reference to FIG. 1.

The server 110 may monitor the health status of the equipment 125 in real-time. In some aspects, the server 110 may monitor the health status based on online process data 240 associated with the equipment 125. The online process data may include real-time data provided by sensor devices 130. In an example, at 245, the server 110 may predict a fault (or faults) associated with the equipment 125. In some aspects, the server 110 may predict the fault prior to an actual occurrence of the fault (e.g., before the fault is observable at the equipment 125). For example, the server 110 may predict temporal information (e.g., a temporal instance when the fault is predicted to occur). In an example, at 245, the server 110 may predict the fault based on the online process data 240, using an autoregressive model (not illustrated).

At 265, the server 110 may generate a fault diagnosis associated with the predicted fault and/or a recommendation (e.g., recommended operator actions) associated with the predicted fault. In an example, the server 110 may generate the fault diagnosis and recommendation based on the fault predicted at 245 and a data included in a library 260. In an example, the data included in the library 260 may include maintenance records 250 and domain knowledge 255. In an example, the domain knowledge 255 may include knowledge acquired by operators of the system 100 over a temporal period (e.g., months, years, etc.). For example, the domain knowledge 255 may include operator knowledge (e.g., stored in the library 260) associated with diagnosing and/or addressing faults associated with equipment 125.

In an example, at 265, the server 110 (e.g., a diagnostics tool or application implemented at the server 110 and/or a communication device 105) may identify the most probable root causes of a failure for equipment 125 based on previous failure patterns associated with the equipment 125. In some cases, the server 110 may calculate and/or assign probability scores and/or confidence scores corresponding to the root causes. In an example, the server 110 may determine the previous failure patterns based on the maintenance records 250 of the equipment 125 and/or similar types of equipment 125. For example, for a positive displacement pump, the server 110 may determine the previous failure patterns based on the maintenance records 250 of other positive displacement pumps. In another example, for a centrifugal pump, the server 110 may determine the previous failure patterns based on the maintenance records 250 of other centrifugal pumps.

In some examples, the server 110 (e.g., the diagnostics tool or application implemented at the server 110 and/or a communication device 105) may identify the most probable recommendations for addressing the predicted fault (e.g., operator actions, maintenance actions, etc.). In some aspects, the server 110 may rank the recommendations based on probability scores, confidence scores, etc. corresponding to the recommendations.

At 265, for example, the server 110 may provide suggested (e.g., possible) failure resolution methods based on the maintenance records 250 and/or the domain knowledge 255. For example, at 265, the server 110 may output a notification inclusive of root causes associated with a predicted fault and/or and recommendations (e.g., recommended operator actions, maintenance actions, etc.) for addressing the predicted fault.

The process flow 200 may support autonomous and/or semi-autonomous implementation of the suggested failure resolution methods, recommendations, etc. provided at 265. For example, the system 100 (e.g., via the server 110 and/or a communication device 105) may implement operator actions, maintenance actions, etc. with partial input from an operator or no input from an operator. In an example, the process flow 200 may support autonomously implementing recommended operator actions, maintenance actions, etc. based on a corresponding probability score and/or confidence score satisfying a threshold. In another example, the process flow 200 may support semi-autonomously implementing recommended operator actions, maintenance actions, etc. based on a user input in response to the notification output at 265.

Accordingly, for example, the server 110 (e.g., machine learning engine 166) may implement algorithms supportive of combining data-driven and knowledge-based approaches. The data (e.g., process data 215, performance curve data 220, maintenance records 250, domain knowledge 255, measurements from sensor devices 130) may be obtained by the server 110 and/or communication devices 105 from multiple sources. For example, process data 215 may include time-stamped industrial data obtained from a process historian. In some examples, maintenance records 250 may include maintenance records corresponding to different types of equipment 125, different groups of equipment 125, or the like. In some examples, the domain knowledge 255 may include domain knowledge corresponding to different operators or users and/or different systems 100 (e.g., different processing facilities, etc.). In some other examples, measurements from sensor devices 130 may include measurements from sensor devices 130 associated with different systems 100 (e.g., different processing facilities, etc.).

Equipment Group Configuration

In some aspects, data described with reference to process flow 200 may be based on equipment group configurations. For example, aspects of the present disclosure may include implementing equipment group configuration (e.g., by the server 110, a communication device 105, etc.) before creating and using the machine learning model 230. In an example, the server 110 (e.g., the machine learning engine 166) may create and train machine learning models described herein (e.g., machine learning models 230, autoregressive models later described with reference to fault prediction at 245, etc.) for groups of equipment 125 based on equipment type. In an example, the server 110 may support creating and training a machine learning model for a group of positive displacement pumps (e.g., equipment 125-$a$ through equipment 125-$f$). In another example, the server 110 may support creating and training a machine learning model for a group of centrifugal pumps (e.g., equipment 125-$g$ through equipment 125-$l$). In an example, the server 110 may identify parameters measured by sensor devices 130 and feed the parameters to the machine learning models (e.g., as inputs to the machine learning models) according to equipment group configuration.

According to example aspects of the present disclosure, equipment group configurations may support the monitoring of a combination of equipment 125 (e.g., equipment 125-$a$ through equipment 125-$f$, equipment 125-$g$ through equipment 125-$l$, a combination of pumps, etc.). For example, an equipment group configuration may include a list of equipment 125, a list of sensor devices 130 respectively associated with individual equipment 125 (e.g., in which sensor device 130-$a$ corresponds to equipment 125-$a$, sensor device 130-$b$ corresponds to equipment 125-$b$, etc.), and a list of equipment subgroups included in the equipment group configuration. Equipment group configurations described herein may support algorithms (e.g., implemented at the server 110) to monitor individual equipment 125 (e.g., individual pumps) and groups of equipment 125 (e.g., groups of pumps) according to operation.

Aspects of implementing equipment group configuration prior to building a machine learning model (e.g., a machine learning model 230, an autoregressive model described with reference to fault prediction at 245, etc.) may support condition monitoring and fault prediction (e.g., anomaly prediction) of equipment 125 using routine operational data. For example, for equipment 125 such as rotating equipment (e.g., a positive displacement pump and/or a centrifugal pump), routine operational data may include measurements of flow rate (also referred to herein as discharge flow), rotational speed (also referred to herein as pump speed), stroke length (also referred to herein as stroke), pressure capability (also referred to herein as pump head), etc. Example aspects of the condition monitoring and fault prediction described herein may be implemented without measurements from vibration or acoustic sensors.

Data Preparation and Feature Identification

Referring to FIG. 2, in an example of data preparation, feature identification, and model preparation, the system 100 may support the creation of a comprehensive fault detection and diagnosis model (e.g., machine learning model 230, an autoregressive model described with reference to fault prediction at 245, etc.) using multiple data sources. The data sources may include, for example, any combination of process data 215 (e.g., process/operation data collected from a process historian), performance curve data 220 (e.g., standard characteristics/performance curves that may serve as a reference for expected error limits for equipment 125 in normal operating conditions/normal operation), calibration data (e.g., pump calibration data), maintenance records 250 (e.g., maintenance logs extracted from an asset management system), and domain knowledge 255 (e.g., domain knowledge-based recommendations for possible failures).

The modelling techniques described herein may include, for example, time series modelling, natural language processing (e.g., text feature extraction and clustering), regression modelling, and clustering techniques. Aspects of the present disclosure include employing such modelling techniques on different types of data described herein (e.g., as obtained from multiple data sources) in order to create a comprehensive fault detection and diagnosis model.

An example of applying different modelling techniques using different types of data to derive a machine learning model (e.g., a machine learning model 230, an autoregressive model, etc.) is described herein. In an example, the server 110 may build/derive a data driven machine learning model (e.g., linear and/or non-linear regression based models) using historical data (e.g., maintenance records 250, etc.) to represent the behavior of equipment 125 such as positive displacement pumps and/or centrifugal pumps. The server 110 may apply the derived machine learning models for online monitoring and anomaly detection in equipment 125 (e.g., positive displacement pumps and/or centrifugal pumps), for example, as described with reference to monitoring of online process data 240 and fault prediction at 245.

According to example aspects of the present disclosure, the modelling techniques may support varying the modelled parameters based on type of equipment 125 (e.g., type of pump). For example, the techniques described herein support the use of different parameters for building/training different machine learning models (e.g., machine learning models 230, autoregressive models, etc.).

In an example case of building a machine learning model (e.g., a machine learning model 230, an autoregressive model, etc.) for a positive displacement pump, the server 110 may support deriving the machine learning model based on a combination of parameters such as discharge flowrate, pump rotational speed, and stroke length. For example, the server 110 may extract temporal information (e.g., timestamps) for operation of a specific positive displacement pump, compute corresponding speed*stroke of the positive displacement pump (or, for group operation, sum of speed*stroke), and build the machine learning model 230 with flowrate values and speed*stroke values based on a reference period/temporal duration, during which the pump was operating without any failure. Once the machine learning model is built, the server 110 may apply the machine learning model for monitoring live data (e.g., online process data 240).

In an example case of building a machine learning model (e.g., a machine learning model 230, an autoregressive model, etc.) for a centrifugal pump, the server 110 may support deriving the machine learning model based on a combination of parameters such as discharge flowrate, pressure capability (also referred to herein as pump head), and pump rotational speed. For example, the server 110 may receive performance curve data 220 (e.g., standard performance curve data) uploaded by a user. The server 110 may fit a polynomial model on the performance curve data 220, thereby generating a baseline model. In some examples, based on a reference period identified by the server 110, the server 110 may compare actual performance curve data (corresponding to the reference period) against the baseline model, thereby learning normal variation and normal range of operation associated with the centrifugal pump. The server 110 (e.g., machine learning engine 166) may apply the baseline model and the normal operation range for monitoring live data (e.g., online process data 240) associated with other centrifugal pumps.

Another example is described of building a model for a centrifugal pump based on calibration data of the centrifugal pump (e.g., obtained during installation of the centrifugal pump). Using the model, the server 110 may predict performance parameters associated with other centrifugal pumps (e.g., flow rate for a given pump head, rotational speed of a pump, etc.).

In some aspects, based on a comparison of the model to actual behavior of the other centrifugal pump, the server 110 may determine current performance data of the other centrifugal pump. Examples of creating comparative performance charts using the model are later described with reference to FIG. 7.

Model Building

Example aspects of model building are further described herein. For an equipment group, the server 110 may identify combined data from different sensor devices 130 (e.g., meters) based on group tags added in the equipment configuration described herein. The server 110 may analyze the combined data together to build a machine learning model 230. In an example, the server 110 may clean (e.g., remove the transient data), resample (e.g., according to specific time intervals), and align (e.g., according to the same time stamp and interval) the combined data such that all the parameters can be analyzed together in building the machine learning model 230. In an example, in creating the machine learning model 230, the server 110 may incorporate performance curve data 220 (e.g., a standard performance curve) and/or raw calibration data. In some aspects, the machine learning model 230 may be referred to as a baseline model.

In an example, for a positive displacement pump, reference period data (e.g., data included in a reference period in which the positive displacement pump was running without any failure) or calibration data may be utilized to model the 'normal' behavior of the positive displacement pump (e.g., under a stable period of operating conditions). In an example, the reference period may include a temporal period immediately following a pump overhaul, so as to ensure that the positive displacement pump is in proper operating condition. Using a reference period as described herein to build the machine learning model 230 provides advantages in that the machine learning model 230 may be rebuilt or retrained (e.g., remodeled) periodically or at will by an operator.

In an example of determining stable operation data (e.g., data associated with the stable period of operating conditions), the server 110 may select reference data (e.g., reference performance data) associated with a reference period, and the server 110 may remove outliers in the reference data prior to building the machine learning model 230. In an example, the outliers may include data obtained during changeover of the positive displacement pump or data associated with ramping up the pump speed/stroke. That is, the outliers may be treated as transient data. Once the transient data is removed from the reference data, the remaining data is equivalent to calibration data. Based on the stable operation data, the server 110 may build the machine learning model 230 according to features such as number of pumps in operation or combinations of sensor values.

The aspects of building the machine learning model 230 based on the features described herein (e.g., number of pumps) may support applying the machine learning model 230 for monitoring single pump operation and/or multiple pumps operating together.

For example, the present disclosure may support developing machine learning models 230 for monitoring multiple pumps. In an example, the machine learning models 230 may be developed using features that represent the behavior of multiple pumps (e.g., a multiple pump system) as a whole. For example, for two or more pumps (e.g., centrifugal pumps) operating together in a group (e.g., as a whole), the techniques described herein support deriving machine learning models 230 based on parameters such as the total discharge flow, combined pump head developed by the two pumps, and individual rotational speeds of the pumps.

According to example aspects of the present disclosure, the machine learning model 230 may provide insight into the expected range of stable operation of equipment 125 (e.g., a pump), and the machine learning model 230 may be configured for alerting a user in according with alert thresholds. The alert thresholds may be based on the normal standard deviation during stable operation of equipment 125. In an example, the server 110 may convert model parameters and deviation values to performance indices (e.g., standard performance index values and deviation index values). Based on the performance indices, the server 110 may rank equipment 125 included in the same equipment group, identify a best performing equipment 125 (e.g., a best pump according to rank), and alert a user (e.g., operator/engineer) of the same.

Performance Indices Example (Positive Displacement Pump)

An example of calculating a performance index and deviation index for an individual positive displacement pump can be expressed as follows:

Performance index=100*Model coefficient/Constant

Example parameters are as follows:
Max rated flow (Fmax)=2000 l/h
Max stroke=100%
Max speed=100%

Constant=Fmax/(Max stroke*Max speed)=0.2

Model coefficient (Slope)=0.24, where the model coefficient (slope) may be obtained directly from the machine learning model 230

Based on the example parameters, the performance index=100*Model coefficient/Constant=100*0.24/0.2=120.

Deviation index=1000*standard deviation/Max rated flow

Example parameters are as follows:
Max rated flow=2000 l/h
Standard deviation=94 l/h
Based on the example parameters, the deviation index=1000*94/2000=47.

Performance Indices Example (Multiple Positive Displacement Pumps)

An example of calculating a performance index and a deviation index for two positive displacement pumps is described herein.

Performance index=100*Model coefficient/Constant

Example parameters are as follows:
Max rated flow (Fmax)=2000 l/h
Max stroke=100%
Max speed=100%
Constant=Fmax/(Max stroke*Max speed)=0.2

Model coefficient (Slope)=0.24, where the model coefficient (slope) may be obtained directly from the machine learning model 230

Based on the example parameters, performance index=100*0.24/0.2=120.

Deviation index=1000*standard deviation/(2*Max rated flow)

Example parameters are as follows:
Max rated flow=2000 l/h
Standard deviation=200 l/h
Based on the example parameters, deviation index=1000*200/(2*2000)=50

Performance Indices Example (Centrifugal Pump)

An example of calculating a deviation index for an individual centrifugal pump is described herein.

Deviation index=1000*|Median deviation|/Max rated flow

Example parameters are as follows:
Max rated flow=3125 m3/h
|Median deviation|=248 m3/h (absolute value)
Based on the example parameters, deviation index=1000*248/3125=79.7.

An example of calculating efficiency for an individual centrifugal pump is described herein.

$$H(m) = \text{Discharge Pressure } (m) - \text{Feed Tank level } (m)$$

$$P_{out}(\text{kW}) = H(m) * \rho\left(\frac{\text{kg}}{\text{m}^3}\right) * g\left(\frac{\text{m}}{\text{s}^2}\right) * Q\left(\frac{\text{m}^3}{\text{h}}\right) * \left(\frac{1}{3.6 \times 10^6}\right)$$

$$P_{out,cum}(\text{kWH}) = \int_{t_1=0\,sec}^{t_2=t\,sec} P_{out} dt/1000$$

$$\text{Efficiency, } \varepsilon_{overall,i} = \frac{P_{out,cum}^i - P_{out,cum}^{i-1}}{P_{in,cum}^i - P_{in,cum}^{i-1}} \times 100\%$$

As described above, for centrifugal pumps, the server 110 may generate the machine learning model 230 using performance curve data 220 (e.g., standard performance curve/calibration data). By combining the machine learning model 230 with reference period data as described herein, algorithms implemented herein may provide a stable operation model and alerts based on, for example, standard deviation as above. The model parameters described herein may be indicative of the efficiency of equipment 125 (e.g., pumps) and a comparison of remaining useful life among the equipment 125. Implementations of the machine learning model 230 (and algorithms implemented thereby) may assist a user in selecting the best pump (e.g., based on performance indices) or the best combination of pumps at any given time.

An example of building the machine learning model 230 in association with monitoring a single pump versus building the machine learning model 230 in association with monitoring multiple pumps (e.g., a pump group) is described herein. When a group of pumps are in operation together, the total flow of the group and the behavior of a corresponding performance curve (e.g., a pump curve) differs from that of a single pump.

An example of a pump configuration with respect to multiple pumps in an equipment group is described herein. The pump configuration may include a list of pump names of pumps included in the equipment group, along with a list of corresponding sensor devices 130 belonging to the equipment group. For example, an equipment group may include two water tanks serving six pumps in the equipment group, and two flow meters in the equipment group may monitor the flow associated with the six pumps. The equipment configuration will include a configuration file including respective tags associated with members of the group (e.g., six pump tags, two tank level tags, two flow meter tags (common to all six pumps)). Using the described tags, the server 110 may extract data from a process historian described herein (e.g., process data 215).

Model Validation

An example of model validation according to example aspects of the present disclosure is described herein. The techniques described herein may include a model validation stage, in which a machine learning model (e.g., machine learning model 230, an autoregressive model, etc.) is tested on unseen data. For example, where the machine learning model is built for a pump, for each time stamp associated with measured data of a pump, the machine learning model may calculate a current deviation value for any output parameter (e.g., flow rate).

In some aspects, instances in which a deviation value is greater than an allowed threshold may be considered as a fault. For example, for such faults identified by the server 110 (e.g., based on an algorithm implemented at fault prediction 245), the server 110 may corroborate the faults using past maintenance records (e.g., included in maintenance records 250) and/or vibration monitoring results.

For example, fault prediction at 245 may include applying online process data 240 (e.g., online flow deviation data) and modeling performance trends using an autoregressive model (e.g., autoregressive model 330 later described with reference to FIG. 3). In an example, the autoregressive model may predict performance trends of equipment 125 in advance. In an example, the autoregressive model may compare the values associated with the predicted performance trends to threshold values identified from the machine learning model 230 (stable period model) to identify any faults that are likely to occur at the equipment 125 (i.e., predicted faults of the equipment 125). The autoregressive model may identify such faults in advance of the faults actually occurring at the equipment 125.

Aspects of the fault prediction at 245 may include the incorporation of prediction key performance indicators (KPIs) to mitigate instances of false alarms (e.g., false indications of equipment failure, false indications of predicted faults). In an example, a first KPI may include a threshold quantity number of consecutive threshold breaches. In another example, a second KPI may include a threshold magnitude of deviation. The threshold values of the KPIs may be set in at the autoregressive model (e.g., the algorithm implemented by the autoregressive model) such that the server 110 generates and outputs alerts indicative of a fault only for actual faults (e.g., instances in which at least one of the KPIs is satisfied). Aspects of the present disclosure support tunability of the threshold values based on equipment 125 (e.g., pump type) and the criticality of the process. For example, tuning of the threshold values may support tuning associated with reducing false positives (i.e., additional detections of faults not recorded in maintenance history) and false negatives (i.e., undetected faults recorded in maintenance history).

Example algorithms and use cases associated with applying the autoregressive model are described herein. The autoregressive models described herein may be used to predict the future value of flow deviation based on current and previous flow deviation values.

In an example, an autoregressive model implemented by aspects of the present disclosure can be expressed as follows:

$$x(t+1)=a_0*x(t)+a_1*x(t-1)+a_2*x(t-2)+\ldots+a_n*x(t-n),$$
where $x(t+1)$ is the predicted value of parameter x at time (t+1),
$x(t)$ is the current value of parameter x at current time t,
$x(t-1)$ is the previous value of parameter x at time (t-1),
n is the order of autoregressive model, and
$a_0, a_1, a_2, \ldots a_n$ are coefficients associated with the autoregressive model.

The autoregressive models may be trained using current and previous values of the parameter x. Autoregressive model training may include estimating the values of the coefficients (e.g., $a_0$ through $a_n$). Once the coefficient values are estimated, the autoregressive model may be used for predicting future values of the parameter x from current and previous values thereof.

An example application of the autoregressive model may include calculating a flow deviation value (e.g., a deviation value between a predicted flow rate and a threshold flow rate) over a temporal duration. For example, the autoregressive model may calculate flow deviation values at one or more timestamps of a temporal duration, at each timestamp of the temporal duration, etc. The autoregressive model may be trained/estimated at each timestamp using present and previous flow deviation values. The trained/estimated autoregressive model may be implemented (e.g., by the server 110) to predict future flow deviation values. In some aspects, the server 110 may calculate KPIs described herein (e.g., for fault prediction) based on the predicted future values of flow deviation.

An example of obtaining coefficient values with respect to building an autoregressive model is described herein. In an example, the server 110 may estimate the coefficients of the autoregressive model using approaches such as traditional least square regression. In an example case, the model coefficients are estimated such that the sum of squared error between the actual values of $x_{act}(t+1)$ and the model predicted values of $x_{pred}(t+1)$ is minimized.

An example of identifying limits/thresholds from the machine learning model 230 (e.g., stable period model/baseline model) is described herein. In an example, the server 110 may calculate limits/thresholds for flow deviation based on a standard deviation ($\sigma$) of flow deviation, in which the standard deviation ($\sigma$) is calculated from the process data 215 used to build the machine learning model 230. In some cases, limits of $+/-2\sigma$ or $+/-3\sigma$ may be used for thresholds settings.

An example of applying additional prediction KPIs in the autoregressive model are described herein. The server 110 may calculate the additional prediction KPIs from future values (e.g., predicted values) of flow deviation as predicted/generated by the autoregressive model. The additional prediction KPIs may include, for example, the first KPI and the second KPI described herein. In an example, the first KPI (also referred to herein as KPI1) may be calculated as number of consecutive prediction steps in which any of the predicted flow deviation values exceeds its threshold limits. In another example, the second KPI (also referred to herein as KPI2) may be calculated as the % magnitude of threshold violation by the precited flow deviation values in each prediction step.

According to the example aspects of the present disclosure as described herein, the machine learning model 230 may be referred to as a stable period machine learning model (e.g., built based on normal operation of equipment 125), used to calculate a current flow deviation value at each timestamp. The autoregressive model is used to predict the future value of flow deviation at each timestamp.

Aspects of Fault-Resolution Tree Building and Recommendation

Aspects of fault-resolution tree building and recommendation implemented with respect to online prediction and recommendation 210 are described herein. For example, once a fault is detected or predicted (e.g., at 245), the server 110 may generate an alert based on which an operator may take corrective action. Aspects of the present disclosure support providing a list of suggested resolutions (e.g., at 265) to the operator based on past maintenance history of equipment 125. In some cases, the list of suggested resolutions may be based on past maintenance history of an equipment group inclusive of the equipment 125.

Accordingly, for example, in addition to providing an alert with respect to a predicted fault of equipment 125 (e.g., a predicted pump condition, a predicted fault associated with a pump, etc.), the disclosure supports a diagnostics algorithm that may provide (e.g., at 265) a list of suggested resolutions corresponding to the predicted status. In some aspects, using the diagnostics algorithm, the server 110 may generate an output for a predicted fault in combination with causal information (e.g., probable root-cause) and recommended operator actions (e.g., recommendations for maintenance actions) corresponding to the predicted fault.

In an example, for a system 100 (e.g., a processing facility, a plant, etc.), inputs to the system 100 at online prediction and recommendation b 210 may include maintenance records 250 (e.g., maintenance data). In some aspects, the inputs may include domain knowledge 255, which includes knowledge acquired by operators of the system 100 over a temporal period (e.g., months, years, etc.). In some cases, the maintenance records 250 may be a main input to the online prediction and recommendation 210.

An example algorithm implemented at online prediction and recommendation 210 may include natural language processing techniques. The example algorithm may be implemented by a machine learning network (e.g., machine learning engine 141, machine learning engine 166) described herein. For example, at 265, the algorithm may include tokenization, vectorization, and mapping of fault and resolution description text included in maintenance records 250. In some cases, the algorithm implemented at 265 may include computing Term-Frequency Inverse-Document Frequency (TF-IDF) to understand and/or identify the importance of each word in documents included in the maintenance records 250. In some examples, the algorithm may include using TF-IDF to rank and recognize fault categories (e.g., main fault categories) from the maintenance records 250.

In some aspects, the algorithm implemented during online prediction and recommendation at 210 may be trained to understand inconsistent vocabulary, industry-specific terms, synonyms, and abbreviations. In an example, whenever a new fault is identified/predicted (e.g., at 245), the algorithm may search for stored instances of the same fault (e.g., as stored in a database 115, memory 165, the library 260, etc.). The algorithm may map corresponding resolutions (e.g., recommended operator actions, recommended maintenance actions, etc.) based on rankings associated with each resolution. In some cases, the rankings may be based on a frequency in which the resolutions have been used for the identified fault.

In an example, the algorithm at online prediction and recommendation 210 may access a fault-resolution index stored in the library 260. For example, offline model building at 210 may include generating the fault-resolution index based on the maintenance records 250 and/or the domain knowledge 255. In an example, the fault-resolution index may include stored instances of faults in which the faults may be indexed based on fault type and/or corresponding resolutions.

The server 110 may provide fault alerts to an operator (e.g., to a communication device 105 of an operator) in combination with the resolutions. In some aspects, the power or impact of the algorithm implemented at online prediction and recommendation 210 may improve as the size of the data (e.g., maintenance records 250, domain knowledge 255, data stored in the library 260) increases. Accordingly, for example, aspects of the present disclosure may support continuous and/or periodic updating of the library 260 as new faults occur and/or are identified, thus improving the variety and/or ranking of recommendations providable by the algorithm.

As described herein, model building at 205 may be implemented offline. At 210, predictive model building (e.g., building the autoregressive model associated with fault prediction at 245) may be implemented periodically, continuously, and/or based on a user input (e.g., engineer-selected). In some aspects, at 210, the fault-resolution tree described with reference to 265 may be built once initially, and in some aspects, be updated periodically, continuously, based on a user input, etc. The example fault prediction and recommendation steps described with reference to 210 may be implemented online and/or when sensor data (e.g., measurement data from sensor devices 130) is received.

The techniques described herein for applying text analytics (e.g., TF-IDF) in maintenance history/job card data and applying fault-tree identification for generating resolutions (e.g., maintenance recommendations) may support improved equipment monitoring and fault prediction at a system 100.

FIG. 3 illustrates a process flow 300 that supports equipment monitoring and fault prediction in accordance with aspects of the present disclosure. In some examples, the process flow 300 may implement aspects of system 100. For example, the process flow 300 may be implemented by a server 110 and/or a communication device 105 described with reference to FIG. 1. In an example, the process flow 300 may be implemented by aspects of the offline model building at 205 and online prediction and recommendation at 210 described with reference to FIG. 2.

In the following description of the process flow 300, the operations may be performed in a different order than the order shown, or the operations may be performed in different orders or at different times. Certain operations may also be left out of the process flow 300, or other operations may be added to the process flow 300. It is to be understood that while a server 110 is described as performing a number of the operations of process flow 300, any device (e.g., another server 110, a communication device 105) may perform the operations shown.

An example of the process flow 300 is described herein with reference to FIGS. 1 and 2. The process flow 300 describes an example of applying the techniques described herein to equipment 125 such as a pump (e.g., a positive displacement pump, a centrifugal pump, etc.)

At 305, the server 110 may model pump calibration data. For example, at 305, the server 110 may receive calibration data associated with equipment 125 (e.g., pump calibration data). In an example, the calibration data may include a standard calibration curve and/or raw calibration data associated with the equipment 125. In an example, at 305, the server 110 may create a baseline model (e.g., a machine learning model 230 described with reference to FIG. 2), using the calibration data.

At 310, the server 110 may extract and prepare process data, such as process/operation data collected from a process historian. The data may include examples of the process data 215 and/or the online process data 240 described with reference to FIG. 2.

At 315, the server 110 may perform online performance monitoring of the equipment 125, using the baseline model (e.g., the machine learning model 230). In an example, the server 110 may create a baseline model (e.g., a machine learning model 230 described with reference to FIG. 2), if using reference period data. For example, the baseline model may process the data extracted/prepared at 310.

At 320, the server 110 may calculate performance indices (e.g., standard performance index values, deviation index values, etc.) of the equipment 125 as described herein using the baseline model (e.g., a machine learning model 230). For example, at 320, the server 110 may calculate performance indices for an individual positive displacement pump, multiple (e.g., two) positive displacement pumps, or an individual centrifugal pump as described herein.

At 325, the server 110 may predict performance parameters (e.g., flow) associated with the equipment 125, using the baseline model (e.g., the machine learning model 230). Further at 325, the server 110 may calculate deviation data (e.g., flow deviation, etc.) between the calculated flow rate obtained from the machine learning model 230 and the current flow rate obtained from online process data 240. Thresholds (e.g., upper and lower limits) associated with the performance parameters may be calculated using the baseline model (e.g., the machine learning model 230) and based on a standard deviation of a reference period as described herein.

At 325, in an example in which the equipment 125 is a pump (e.g., a positive displacement pump, a centrifugal pump, etc.), the server 110 may predict an expected flow and calculate a flow deviation for any rotation speed/stroke combination. Accordingly, for example, the calculated deviation data at 325 may include calculated deviation values between predicted flow rates and current flow rates.

At 330, the server 110 may feed the calculated deviation data (e.g., calculated deviation values) into an autoregressive model which can model the trend of deviation and in turn predict threshold breaches in advance.

Figure 6:
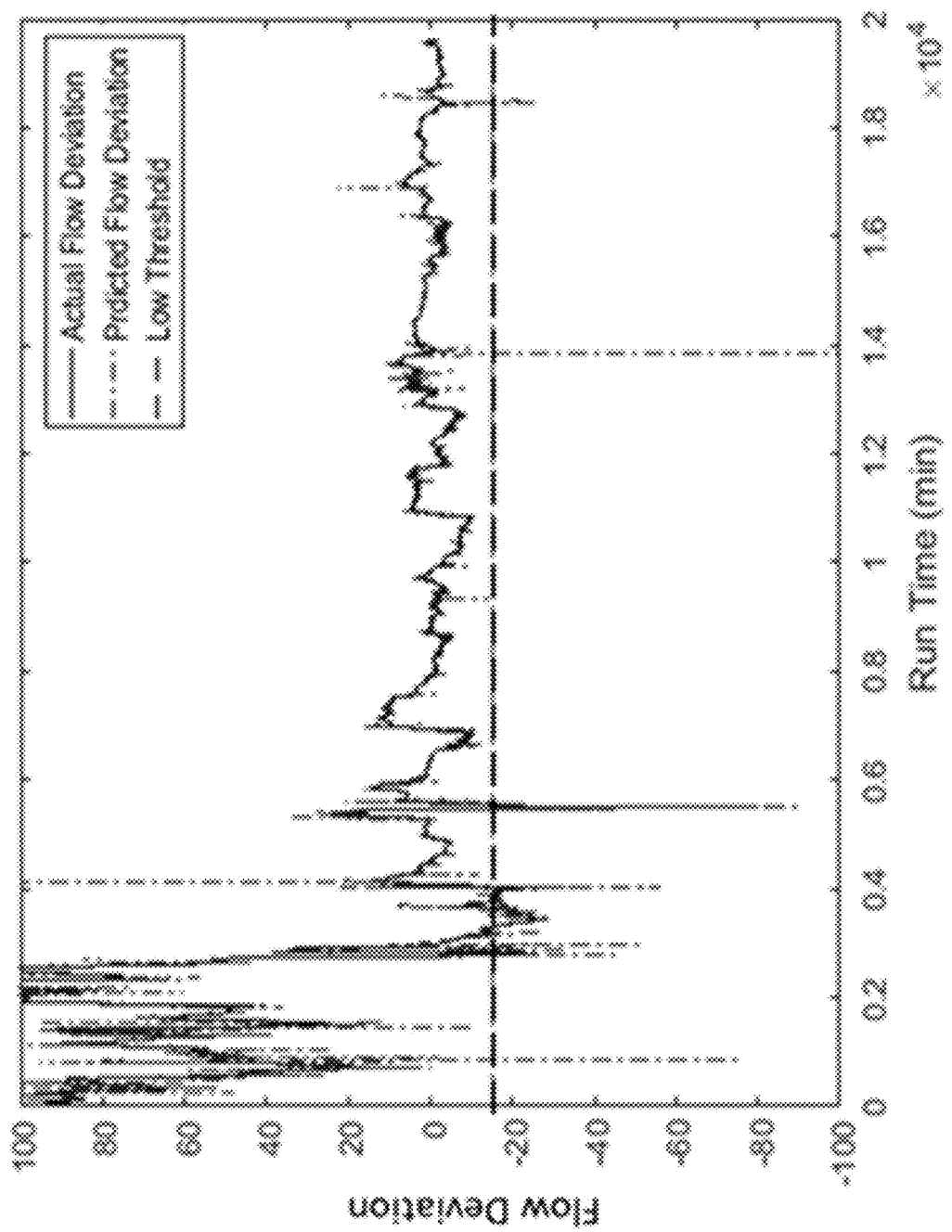
FIG. 6 illustrates an example in which calculated flow deviation is fed into an autoregressive model in accordance with aspects of the present disclosure.

At 335, based on the autoregressive model processing the calculated deviation data, the server 110 may predict a future trend of the deviation. For example, the future trend may include a plurality of predicted future values associated with a performance parameter, in which the predicted future values exceed a threshold. In an example, in the case of a pump, the future trend may be a predicted future trend of flow deviation (e.g., including predicted flow deviation values). An example output of the autoregressive model is illustrated at FIG. 6.

Figure 7:
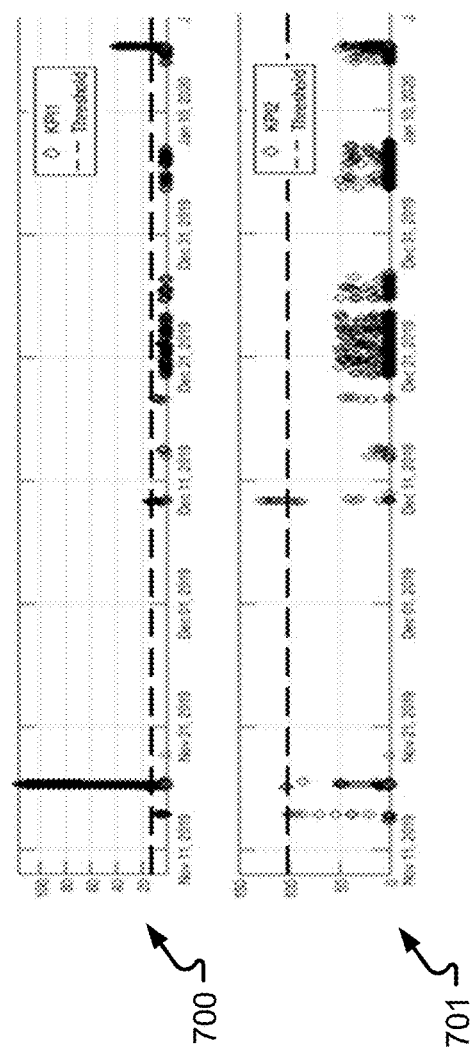
FIG. 7 illustrates examples of configured prediction KPIs and KPI thresholds for alerts in accordance with aspects of the present disclosure.

At 340, the server 110 may calculate prediction KPIs described herein based on the predicted future trend of deviation (e.g., the predicted future trend of flow deviation). The calculated prediction KPIs may be referred to as 'alert KPIs.' That is, for example, when at least one calculated prediction KPI ('alert KPI') reaches or exceeds its threshold value, the server 110 may output an alert indicative of a fault of the equipment 125. An example of prediction KPI thresholds and configured alerts is illustrated at FIG. 7.

At 345, the server 110 may determine whether any of the predicted future values exceed a corresponding threshold. For example, the server 110 may check a predicted future value against a threshold(s) and diagnose any faults. In an example, the server 110 may identify a predicted fault based on whether any predicted future values satisfy criteria associated with a KPI (e.g., a first KPI and/or a second KPI as described herein). In some aspects, at 345, the server 110 may generate a fault diagnosis associated with the predicted fault and/or a generate recommendations for addressing the predicted fault (e.g., as described at 265 with reference to FIG. 2). In an example, a fault diagnosis may include an indication of a root cause associated with a predicted fault.

At 360, the server 110 may generate a fault-resolution index based on maintenance data 350 and/or domain knowledge 355. The maintenance data 350 and domain knowledge 355 may include example aspects of maintenance records 250 and domain knowledge 255 described with reference to FIG. 2. The fault-resolution index generated at 360 may include example aspects of the fault-resolution index described with reference to the library 260 of FIG. 2.

At 365, the server 110 may output a notification (e.g., an alert) in combination with maintenance information. For example, the server 110 may output a notification inclusive of the fault diagnosis of 345 and/or recommendations for addressing a predicted fault indicated in the fault diagnosis. Aspects of 365 include example aspects of 265 described with reference to FIG. 2).

The process flow 300 may support autonomous and/or semi-autonomous implementation of the recommendations provided at 365. For example, the system 100 (e.g., via the server 110 and/or a communication device 105) may implement operator actions, maintenance actions, etc. with partial input from an operator or no input from an operator. In an example, the process flow 300 may support autonomously implementing a recommendation (e.g., recommended operator actions, maintenance actions, etc.) based on a corresponding probability score and/or confidence score satisfying (e.g., exceeding) threshold. In another example, the process flow 300 may support semi-autonomously implementing recommendations (e.g., recommended operator actions, maintenance actions, etc.) based on a user input in response to the notification output at 365.

Figure 4:
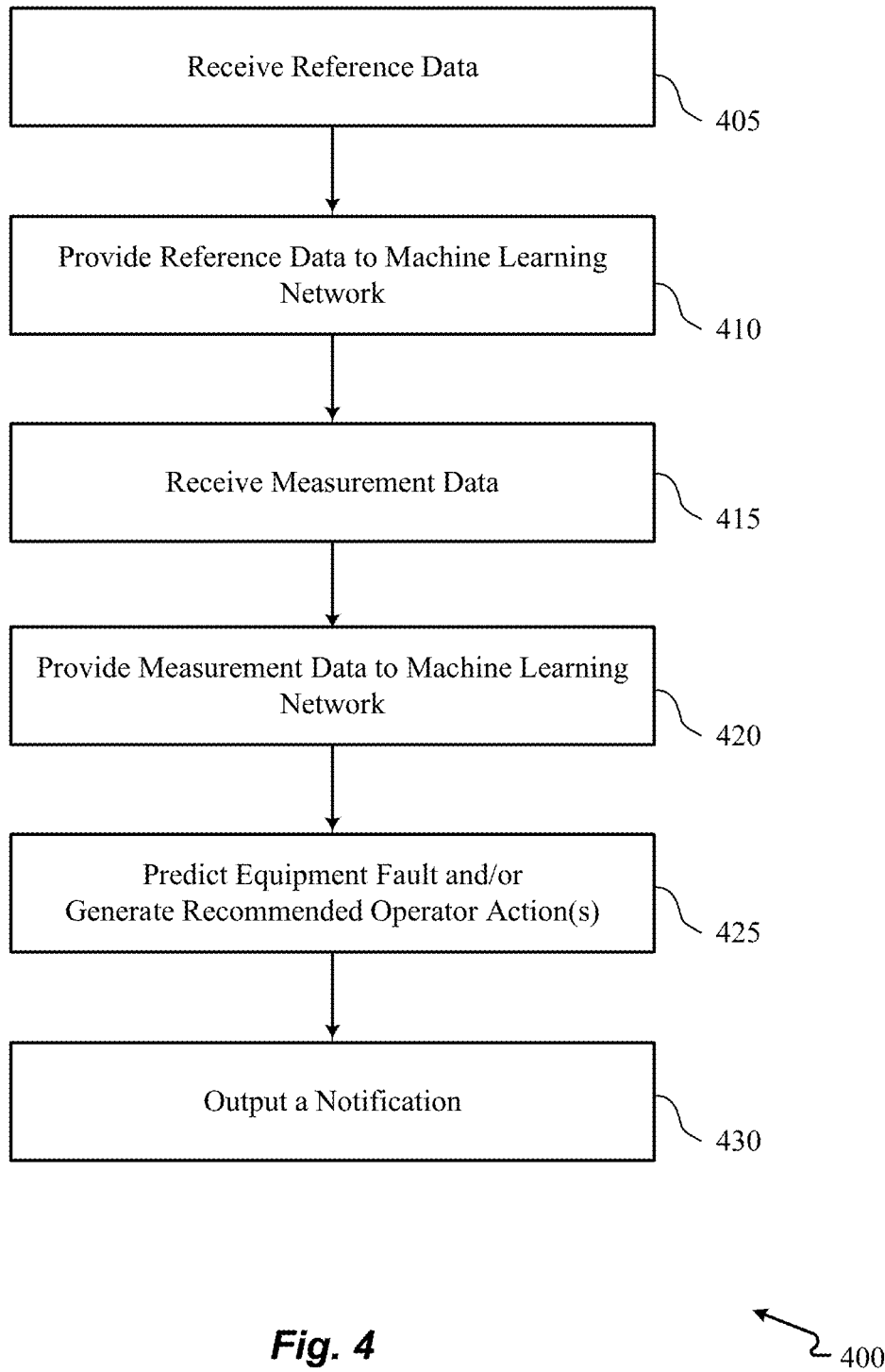
FIG. 4 illustrates an example of a process flow that supports equipment monitoring and fault prediction in accordance with aspects of the present disclosure.

FIG. 4 illustrates a process flow 400 that supports equipment monitoring and fault prediction in accordance with aspects of the present disclosure. In some examples, the process flow 400 may implement aspects of system 100, process flow 200, and/or process flow 300. For example, the process flow 400 may be implemented by a server 110 and/or a communication device 105 described with reference to FIG. 1.

In the following description of the process flow 400, the operations may be performed in a different order than the order shown, or the operations may be performed in different orders or at different times. Certain operations may also be left out of the process flow 400, or other operations may be added to the process flow 400. It is to be understood that while a server 110 is described as performing a number of the operations of process flow 400, any device (e.g., another server 110, a communication device 105) may perform the operations shown.

At 405, the server 110 may receive reference data associated with a set of equipment 125. The set of equipment 125 may be of a first equipment type, such as a pump type. For example, the first equipment type may include a positive displacement pump type, a centrifugal pump type, or any other pump type.

In an example, the set of equipment 125 may include a first set of equipment 125 of the first equipment type. For example, the first set of equipment 125 may include one or more positive displacement pumps. In another example, the set of equipment 125 may include a second set of equipment 125 of the first equipment type. For example, the second set of equipment 125 may include one or more centrifugal pumps. The reference data may include at least one of: first reference data associated with the first set of equipment 125; and second reference data associated with the second set of equipment 125.

At 410, the server 110 may provide at least a portion of the reference data to a machine learning network.

At 415, the server 110 may receive an output from the machine learning network may be in response to the machine learning network processing at least a portion of the reference data.

In some aspects, the reference data may include at least one of: calibration data associated with the set of equipment 125; and a set of operator actions corresponding to a set of status types of the set of equipment 125. In an example, the processing of at least the portion of the reference data by the machine learning network may include generating a predictive model based on the reference data.

In some aspects, the reference data may include maintenance data associated with the set of equipment 125. In an example, the processing of at least the portion of the reference data by the machine learning network may include: applying one or more natural language processing algorithms to the maintenance data; and generating causal information associated with a predicted status of the set of equipment 125, one or more recommended operator actions associated with the predicted status, or both. In some aspects, generating the causal information may be based on applying the one or more natural language processing algorithms to the maintenance data.

In some aspects, the reference data may include: reference performance data associated with the set of equipment 125; and a set of operating conditions associated with the reference performance data. In an example, the processing of at least the portion of the reference data by the machine learning network may include: generating the predictive model based on at least one of: the reference performance data and the set of operating conditions; and calibration data associated with the set of equipment 125. In some aspects, the calibration data may include a performance curve associated with the set of equipment 125.

At 415, the server 110 may receive measurement data associated with the set of equipment 125. In some aspects, the measurement data associated with the set of equipment 125 may include at least one of (e.g., at least two of): a flow rate associated with the set of equipment 125; a rotational speed associated with the set of equipment 125; a stroke length associated with the set of equipment 125; and a pressure capability associated with of the set of equipment 125. In an example, the measurement data may be associated with one or more sensors (e.g., sensor devices 130) coupled to the set of equipment 125.

At 420, the server 110 may provide at least a portion of the measurement data to a machine learning network.

At 425, the server 110 may receive an output from the machine learning network in response to the machine learning network processing at least the portion of the measurement data. In some aspects, the processing of at least the portion of the measurement data may be based on a predictive model associated with the set of equipment 125.

In some aspects, the output may include a predicted status of the set of equipment 125. In an example, the predicted status may include a predicted fault associated with the set of equipment 125 (e.g., at 425, the machine learning network may generate the predicted fault). In some other aspects, the predicted status may include temporal information associated with the predicted status, and the output from the machine learning network may include causal information associated with the predicted status. In some cases, the predicted status may be based on predicted performance data. In some other aspects, the output from the machine learning network may include ranking information associated with the set of equipment 125.

In some aspects, the measurement data may include: one or more current measurement values (e.g., a plurality of current measurement values) corresponding to one or more parameters associated with the set of equipment 125; and one or more previous measurement values corresponding to the one or more parameters. In an example, the processing of at least the portion of the measurement data by the machine learning network may include calculating the predicted performance data associated with the set of equipment 125 based on: one or more first deviation values between the one or more current measurement values and a threshold value (e.g., a plurality of first deviation values between a plurality of current measurement values and a threshold value); one or more second deviation values between the one or more previous measurement values and the threshold value (e.g., a plurality of second deviation values between a plurality of previous measurement values and the threshold value); or both. In some cases, the server 110 may calculate, based on the predictive model, at least one of: the one or more first deviation values (e.g., the plurality of first deviation values); the one or more second deviation values (e.g., the plurality of second deviation values); and the threshold value.

In some aspects, the predicted performance data may include: a predicted value corresponding to the one or more parameters (e.g. a predicted value of flow rate); and a deviation value between the predicted value and a threshold value. In an example, the predicted status may be based on the predicted value, the deviation value, or both.

In some other aspects, the predicted performance data may include: a set of predicted values corresponding to the one or more parameters, the set of predicted values exceeding a threshold value. In an example, the predicted status may be based on a quantity of the predicted values exceeding the threshold value. In some cases, the set of predicted values may be consecutive predicted values exceeding the threshold value.

At 425, the server 110 may generate one or more recommended operator actions associated with the predicted fault based on data associated with one or more previous maintenance actions and the predicted fault. In an example, the data may include at least one of: a type of the predicted fault; and a frequency of the one or more previous maintenance actions with respect to the type of the predicted fault and a temporal duration.

In some cases, the server 110 may retrieve, from a library, the data associated with the one or more previous maintenance actions. In an example, the library may include an indexing of a set of fault types and a set of previous maintenance actions corresponding to the set of fault types.

At 430, the server 110 may output a notification based on the output from the machine learning network, the notification including an indication of the predicted status. In an example, the notification may include an indication of the one or more recommended operator actions. In some examples, the notification may include an indication of the causal information associated with the predicted status. In some other aspects, the notification may include an indication of the ranking information.

The process flow 400 may support autonomous and/or semi-autonomous implementation of the one or more recommended operator actions provided at 425. For example, the system 100 (e.g., via the server 110 and/or a communication device 105) may implement the one or more recommended operator actions with partial input from an operator or no input from an operator. In an example, the process flow 400 may support autonomously implementing one or more recommended operator actions based on a corresponding probability score and/or confidence score satisfying a threshold. In another example, the process flow 400 may support semi-autonomously implementing one or more recommended operator actions based on an operator input in response to the notification output at 430.

Figure 5:
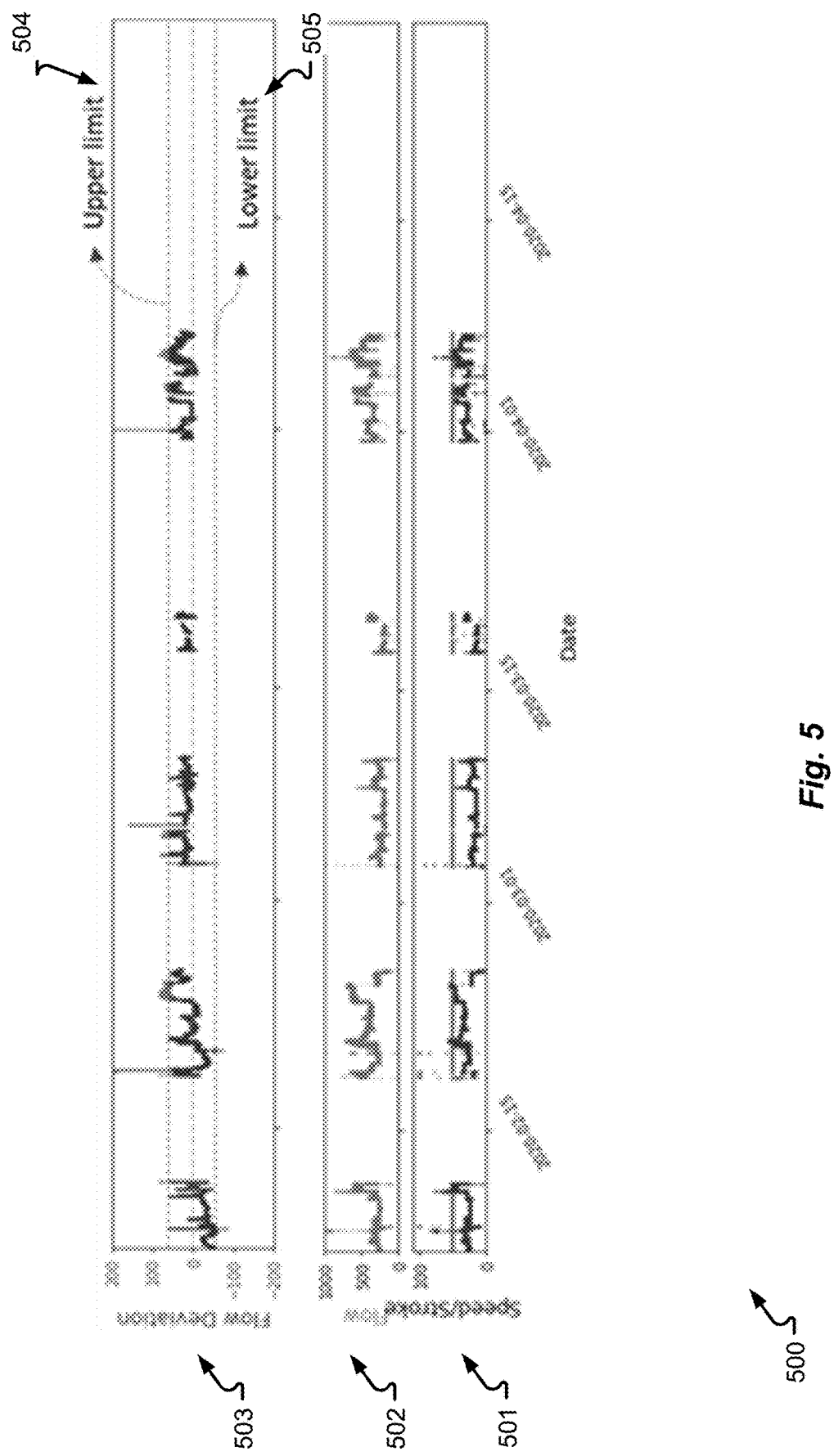
FIG. 5 illustrates an example of online process monitoring in accordance with aspects of the present disclosure.

FIG. 5 illustrates an example 500 of online process monitoring in accordance with aspects of the present disclosure. FIG. 5 illustrates an example of aspects of online process monitoring of equipment 125 (e.g., a positive displacement pump), as described with respect to 240 of FIG. 2 and 315 of FIG. 3.

Referring to FIG. 5, rotation speed (indicated at 501), stroke (indicated at 501), and flow (indicated at 502) are input parameters to the baseline model described herein. A selected stable period of operation has already been selected and modelled (e.g., the baseline model has been generated).

Using the algorithms described herein and the baseline model, the server 110 may predict the expected flow and flow deviation (indicated at 503) for any speed/stroke combination. The thresholds (e.g., upper limit 504 and lower limit 505) are also based on the baseline model and the standard deviation of the reference period.

FIG. 6 illustrates an example 600 in which calculated flow deviation data (e.g., the predicted flow deviations at 503 of FIG. 5) is fed into an autoregressive model described herein. Using the autoregressive model, the server 110 may model the trend of the flow deviation (e.g., actual deviation, predicted deviation over a time window, such as 15 mins) and in turn predict threshold breaches (i.e., predicted flow exceeding the threshold value) in advance.

FIG. 7 illustrates examples 700 and 701 of configured prediction KPIs and KPI thresholds for alerts. For example, FIG. 7 illustrates examples 700 and 701 of configured prediction KPIs trends. Example 700 illustrates a prediction KPI corresponding to the first KPI described herein (e.g., criteria such as number of successive threshold breaches by the predicted flow deviations). Example 701 illustrates a prediction KPI corresponding to the second KPI described herein (e.g., magnitude of threshold breaches by the predicted flow deviations in percentage).

Figure 8:
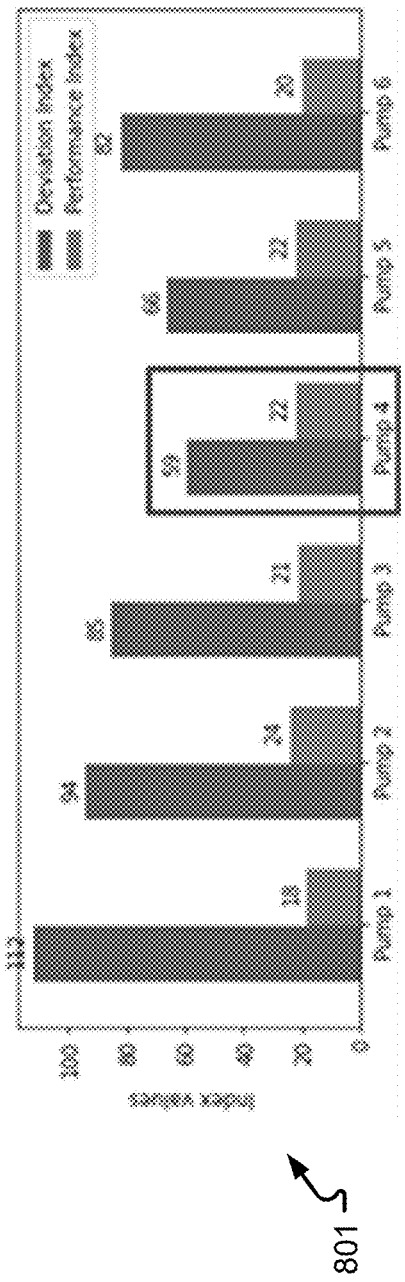
FIG. 8 illustrates example comparative performance charts comparing equipment of an equipment group based on performance indices and deviation indices, in accordance with aspects of the present disclosure.
Figure 8:
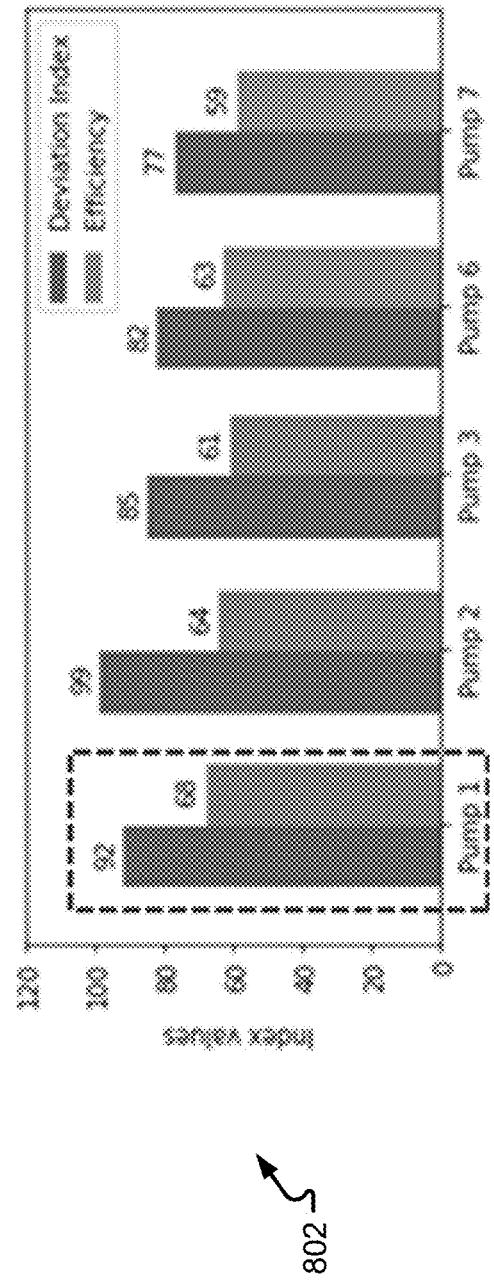

FIG. 8 illustrates an example comparative performance chart 801 comparing positive displacement pumps based on performance indices and deviation indices. FIG. 8 further illustrates an example comparative performance chart 802 comparing centrifugal pumps based on performance indices and deviation indices. According to example aspects of the present disclosure, the example charts 801 and 802 may assist an operator to choose the best performing pump and a combination of pumps at any given time.

The example charts 801 and 802 are examples of comparative performance charts among pumps of the same type, which may be created by applying a machine learning model associated with a pump of a given pump type (e.g., positive displacement pump, centrifugal pump, etc.). For example, once a model is built as described herein using pump calibration data or reference period data, the server 110 may calculate additional parameters from model coefficients to create a comparative performance chart of pumps in an equipment group. Referring to the comparative performance charts 801 and 802, example indices are defined in which a relatively high performance index value indicates higher pumping efficiency and a relatively low deviation index value indicates lesser variance in pumping output for any pump.

For example, comparative performance chart 801 includes 6 positive displacement pumps (e.g., Pump 1 through Pump 6) included in an equipment group. According to example aspects of the present disclosure, the server 110 may assign ranking information to Pump 1 through Pump 6 based on the corresponding deviation index values and performance index values. For example, the server 110 may identify Pump 4 as the best pump among the group (e.g., assign a highest ranking to Pump 4) based on Pump 4 having the lowest deviation index value of 59 and a relatively high performance index value of 22 among Pump 1 through Pump 6.

In another example, comparative performance chart 802 includes 5 centrifugal pumps (e.g., Pumps 1 through 3, Pump 6, and Pump 7) included in an equipment group. According to example aspects of the present disclosure, the server 110 may assign ranking information to the pumps based on the corresponding deviation index values and efficiency values. For example, the server 110 may identify Pump 1 as the best pump among the group (e.g., assign a highest ranking to Pump 1).

Figure 9:
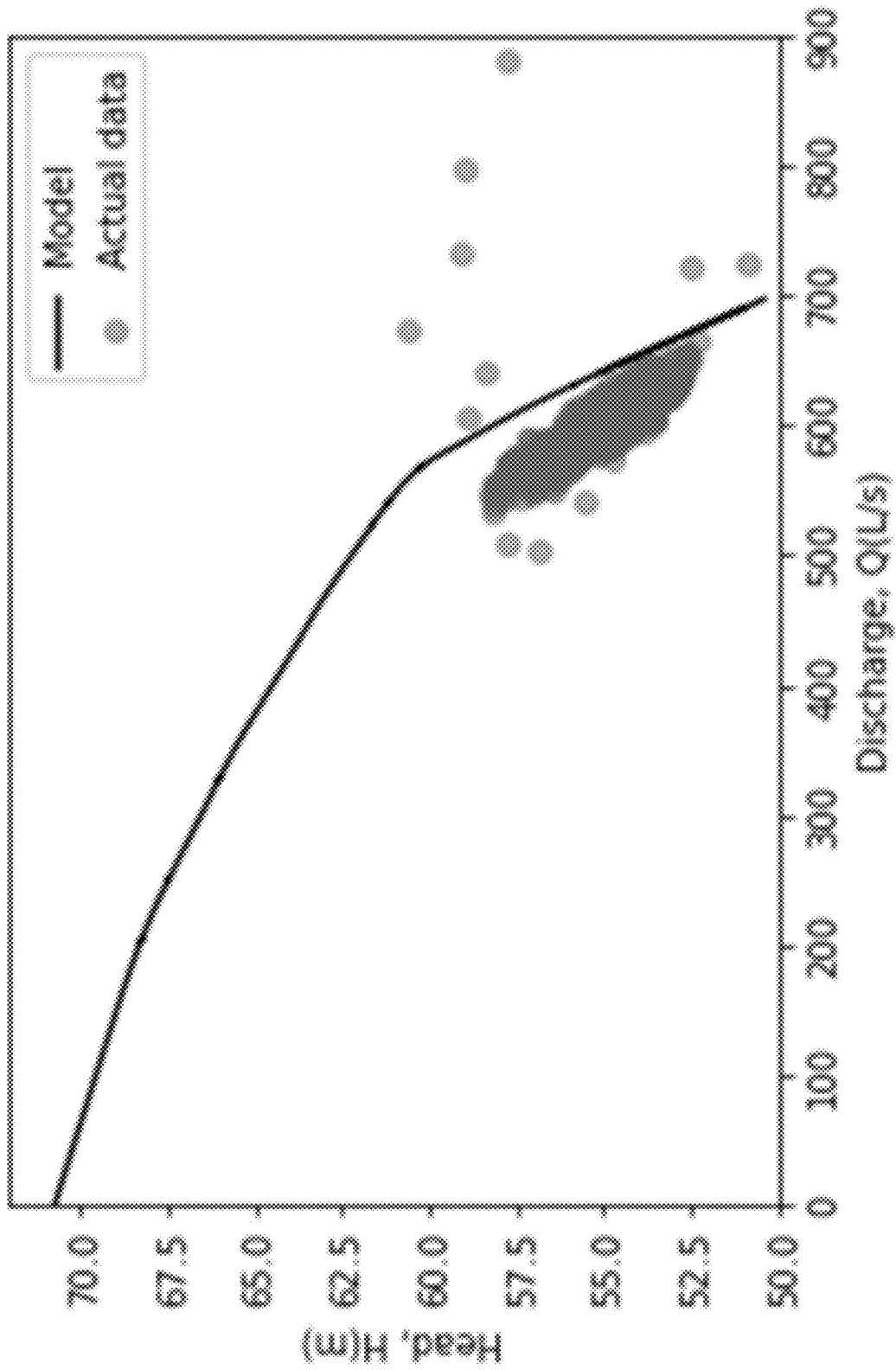
FIG. 9 illustrates an example graph of a model built from calibration data for a centrifugal pump and the online process data overlaid thereon in accordance with aspects of the present disclosure.

FIG. 9 illustrates an example graph 900 of a model (e.g., a baseline model described herein) built from calibration data for a centrifugal pump and the online process data overlaid thereon. The graph 900 illustrates an example comparison of current performance of the centrifugal pump against the model. For example, the graph 900 illustrates an overlay of actual process data of a 'Pump 2' with a baseline model based on a standard pump performance curve.

Figure 10:
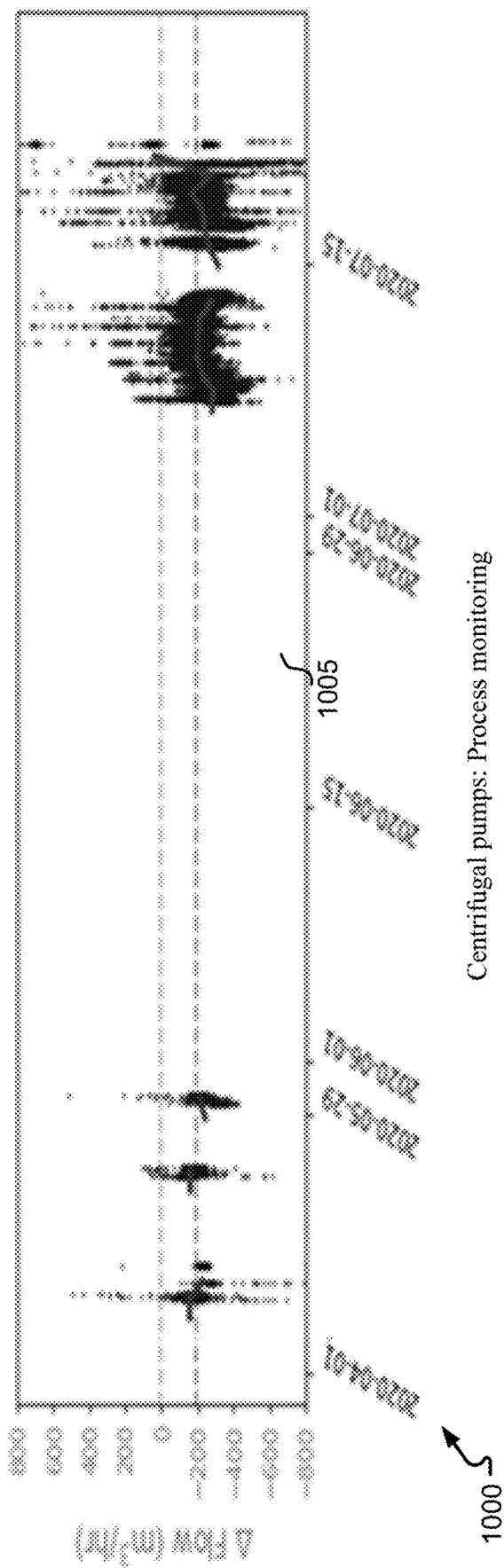
FIG. 10 illustrates an example graph showing process monitoring for a centrifugal pump in accordance with aspects of the present disclosure.

FIG. 10 illustrates an example graph 1000 showing process monitoring (e.g., online process monitoring described herein) for a centrifugal pump. In the example graph 1000, an actual flow rate (e.g., measured flow rate) is compared against a predicted flow rate (e.g., as predicted by a baseline model or stable period model described herein). The limits/thresholds are obtained from reference period/stable operation period of the pump.

Figure 11:
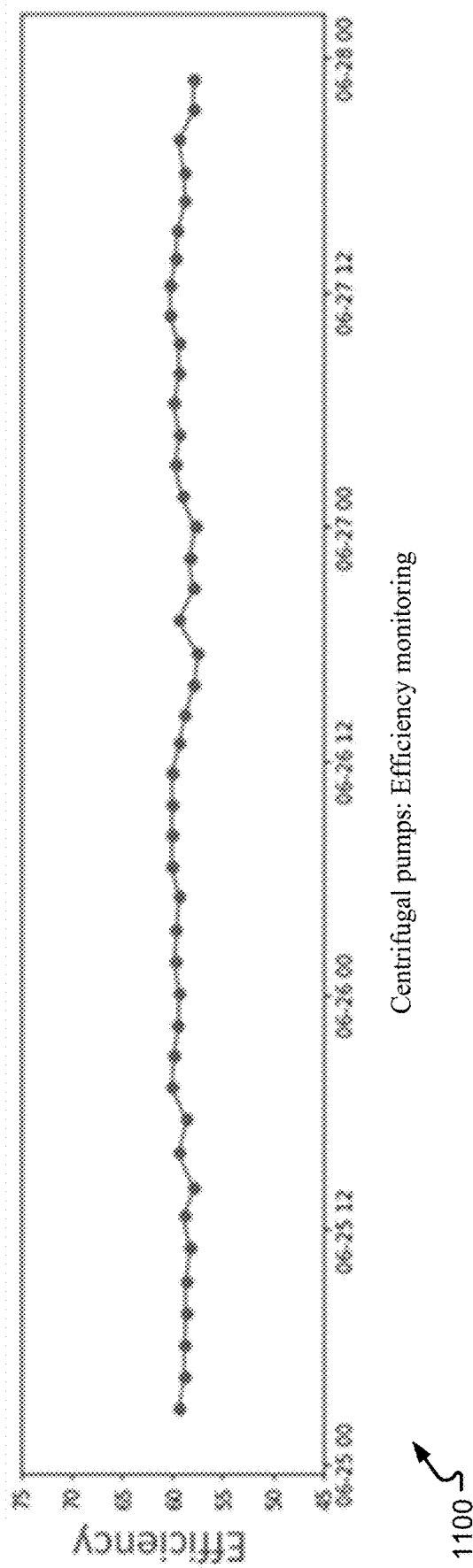
FIG. 11 illustrates an example graph showing efficiency calculation and monitoring in association with process monitoring of a centrifugal pump in accordance with aspects of the present disclosure.

FIG. 11 illustrates an example graph 1100 showing efficiency calculation and monitoring in association with process monitoring of equipment 125 (e.g., a centrifugal pump).

Figure 12:
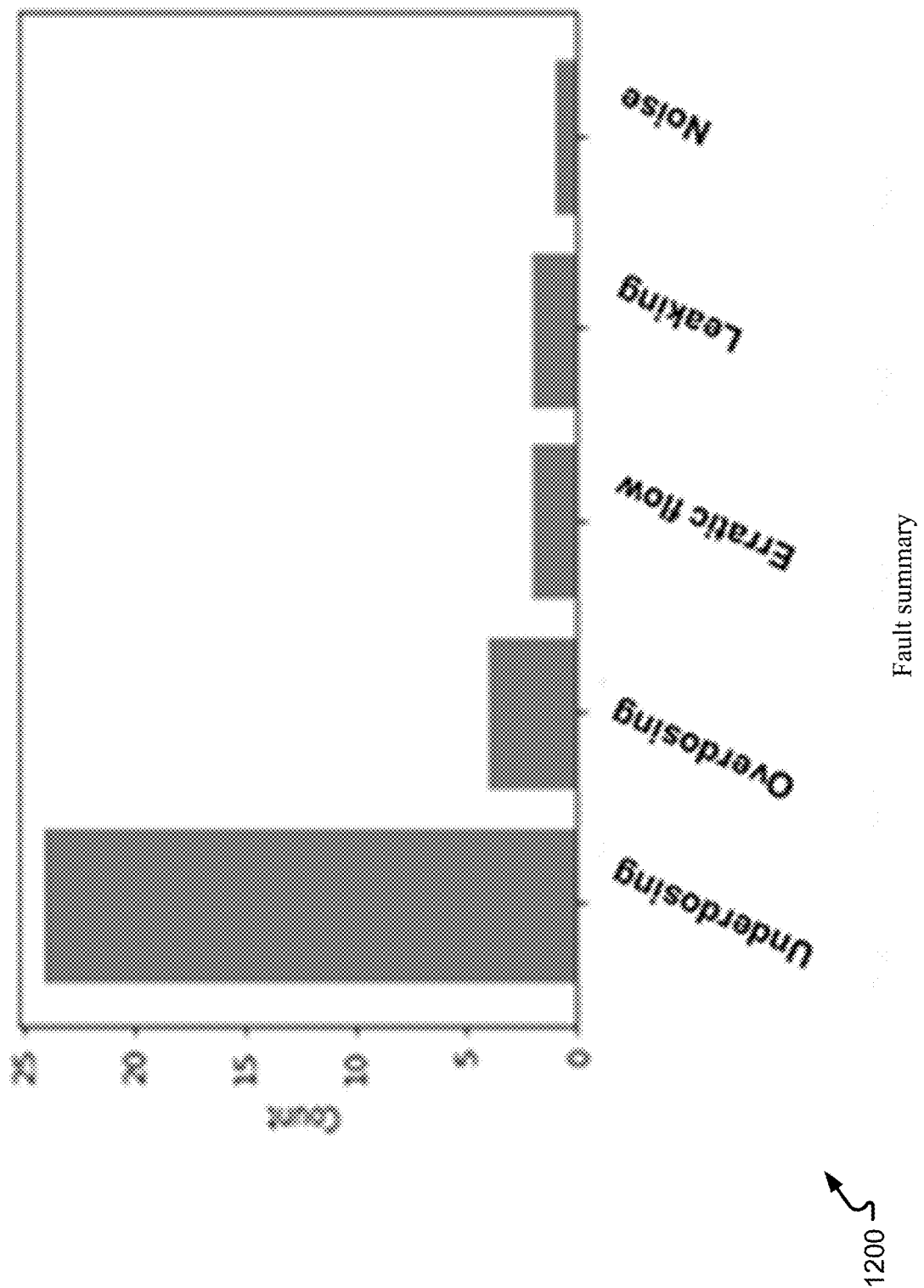
FIG. 12 illustrates an example chart showing a fault summary created based on applying natural language processing methods on previous job cards for any pump group in accordance with aspects of the present disclosure.

FIG. 12 illustrates an example chart 1200 showing a fault summary created based on applying natural language processing methods as described herein on previous job cards/maintenance history (e.g., maintenance records 250 described with reference to FIG. 2, maintenance data 350 described with reference to FIG. 3) for any pump group. In some aspects, the server 110 may provide the fault summary in a pump group report.

Figure 13:
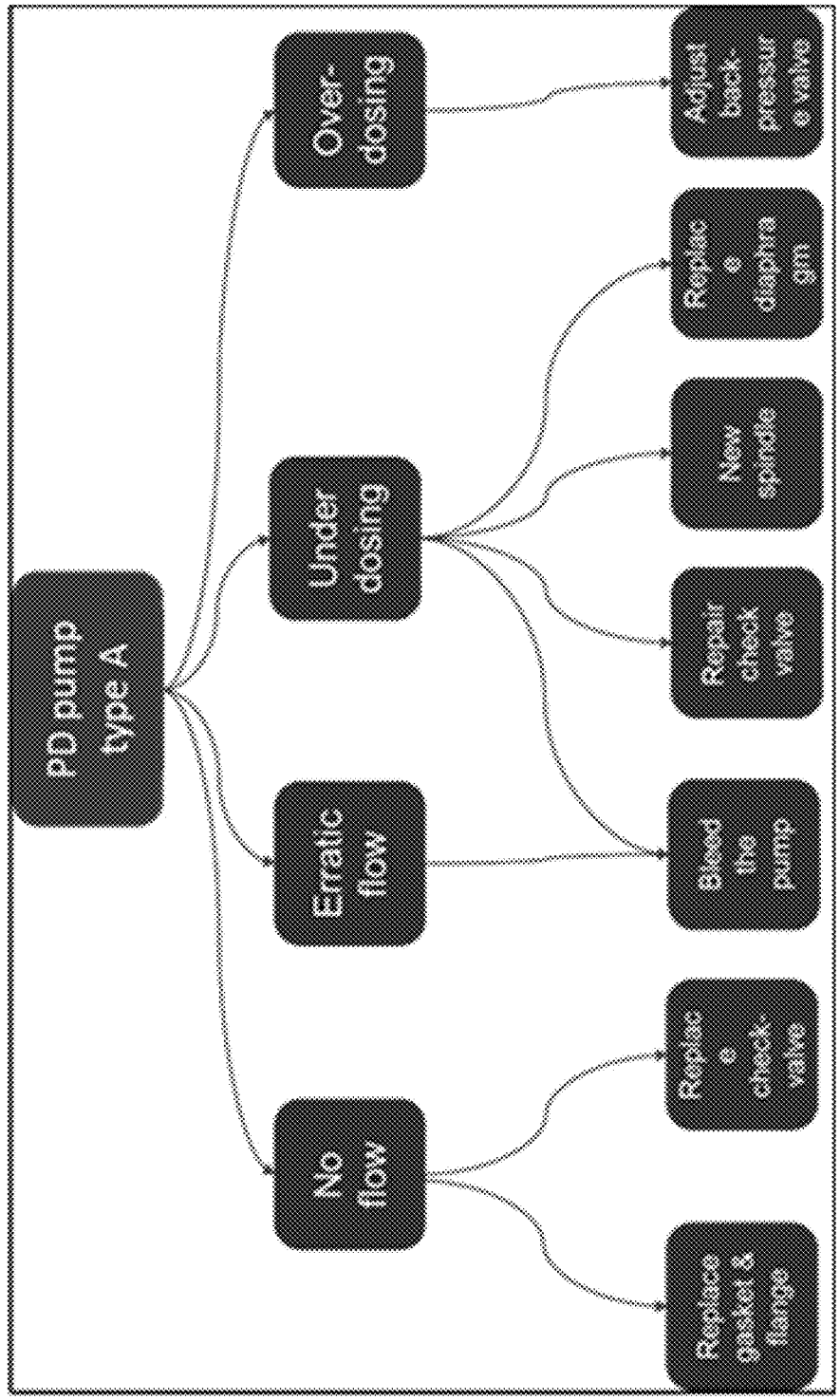
FIG. 13 illustrates an example graph showing an example fault-resolution tree generated based on job cards.

FIG. 13 illustrates an example graph 1100 showing an example fault-resolution tree generated based on job cards and domain knowledge for a pump group. The job cards may include aspects of maintenance records 250 described with reference to FIG. 2 and maintenance data 350 described with reference to FIG. 3. The domain knowledge may be manually entered domain knowledge. The domain knowledge may include aspects of domain knowledge 255 described with reference to FIG. 2 and domain knowledge 355 described with reference to FIG. 3.

Any of the steps, functions, and operations discussed herein can be performed continuously and automatically.

The exemplary systems and methods of this disclosure have been described in relation to examples of a server 110, a communication device 105, equipment 125, and sensor devices 130. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a communications network and/or the Internet, or within a dedicated secure, unsecured and/or encrypted system. Thus, it should be appreciated, that the components of the system can be combined into one or more devices, such as a server, communication device, or collocated on a particular node/element(s) of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various communications links, including communications channel(s), connecting the elements can be wired or wireless links, or any combination thereof, or any other known or later developed element(s) that is capable of supplying and/or communicating data and/or signals to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the embodiment(s). Additionally, the exact sequence of events need not occur as set forth in the disclosed embodiments, but rather the steps can be performed by one or the other device(s) in the system. Additionally, the exemplary techniques illustrated herein are not limited to the specifically illustrated embodiments but can also be utilized with the other exemplary embodiments and each described feature is individually and separately claimable. As will be appreciated by one skilled in the art, aspects of the present disclosure may be embodied as a system, method, and/or computer program product. Thus, aspects of the present disclosure may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

A computer readable medium as described herein may be a computer readable storage medium, examples of which include, but are not limited to, an electronic, magnetic, optical, electromagnetic, infrared, or semiconductor system, apparatus, or device, or any suitable combination thereof. As used herein, a computer readable storage medium may be any non-transitory, tangible medium that can contain or store a program for use by or in connection with an instruction execution system, apparatus, device, computer, computing system, computer system, or any programmable machine or device that inputs, processes, and outputs instructions, commands, or data. A non-exhaustive list of specific examples of a computer readable storage medium include an electrical connection having one or more wires, a portable computer diskette, a floppy disk, a hard disk, a random access memory (RAM), a read-only memory (ROM), a USB flash drive, an non-volatile RAM (NVRAM or NOVRAM), an erasable programmable read-only memory (EPROM or Flash memory), a flash memory card, an electrically erasable programmable read-only memory (EEPROM), an optical fiber, a portable compact disc read-only memory (CD-ROM), a DVD-ROM, an optical storage device, a magnetic storage device, or any suitable combination thereof. A computer readable storage medium can be any computer readable medium that is not a computer readable signal medium such as a propagated data signal with computer readable program code embodied therein.

Program code may be embodied as computer-readable instructions stored on or in a computer readable storage medium as, for example, source code, object code, interpretive code, executable code, or combinations thereof. Any standard or proprietary, programming or interpretive language can be used to produce the computer-executable instructions. Examples of such languages include C, C++, C#, Pascal, JAVA, JAVA Script, BASIC, Smalltalk, Visual Basic, and Visual C++.

Transmission of program code embodied on a computer readable medium can occur using any appropriate medium including, but not limited to, wireless, wired, optical fiber cable, radio frequency (RF), or any suitable combination thereof.

The program code may execute entirely on a user's/operator's/administrator's computer, partly on such a computer, as a stand-alone software package, partly on the user's/operator's/administrator's computer and partly on a remote computer, or entirely on a remote computer or server. Any such remote computer may be connected to the user's/operator's/administrator's computer through any type of network, including a local area network (LAN) or a wide area network (WAN), or the connection may be made to an external computer (for example, through the Internet using an Internet Service Provider).

A number of variations and modifications of the disclosure can be used. It would be possible to provide for some features of the disclosure without providing others.

In yet another embodiment, the systems, methods and protocols described herein can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various communication methods, protocols and techniques according to the aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein include, but are not limited to, at least one of Qualcomm® Snapdragon® 800 and 801, Qualcomm® Snapdragon® 610 and 615 with 4G LTE Integration and 64-bit computing, Apple® A7, A8, ABX, A9, A9X, or A10 processors with 64-bit architecture, Apple® M7, M8, M9, or M10 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer, workstation or mobile device platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized. The methods illustrated herein however can be readily implemented in hardware and/or software using any known or later developed systems or structures, devices and/or software by those of ordinary skill in the applicable art from the functional description provided herein and with a general basic knowledge of the computer and image processing arts.

In yet another embodiment, the disclosed methods may be partially implemented in software that can be stored on a storage medium, executed on programmed general-purpose computer with the cooperation of a controller and memory, a special purpose computer, mobile device, smartphone, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, as a plug-in, a system component, or the like. The system can also be implemented by physically incorporating the system and/or method into a software and/or hardware system, such as the hardware and software systems of an image processor.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, microcode, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

The terms "determine," "calculate," "compute," and variations thereof, as used herein, are used interchangeably and include any type of methodology, process, mathematical operation or technique.

While this technology has been described in conjunction with a number of embodiments, it is evident that many alternatives, modifications and variations would be or are apparent to those of ordinary skill in the applicable arts. Accordingly, it is intended to embrace all such alternatives, modifications, equivalents, and variations that are within the spirit and scope of this disclosure.

All references mentioned in the document submitted herewith are herein incorporated by reference in their entirety.

What is claimed is:

1. A method comprising:
    receiving measurement data associated with a set of equipment and one or more sensors coupled to the set of equipment;
    providing at least a portion of the measurement data to a machine learning network;
    receiving an output from the machine learning network in response to the machine learning network processing at least the portion of the measurement data and at least a portion of reference data associated with the set of equipment, wherein the reference data comprises reference performance data associated with the set of equipment and a set of operating conditions associated with the reference performance data,
    wherein the processing of at least the portion of the measurement data and at least the portion of reference data associated with the set of equipment is based at least in part on a predictive model associated with the set of equipment,
    wherein the predictive model is generated based at least in part on the reference performance data and the set of operating conditions, and
    wherein the output comprises an indication of a predicted status of the set of equipment and a future temporal instance associated with the predicted status; and
    outputting a notification in response to the indication of the predicted status comprised in the output from the machine learning network, the notification comprising the indication of the predicted status and an indication of one or more recommended operator actions associated with addressing the predicted status.

2. The method of claim 1, wherein:
    the indication of the predicted status comprises an indication of a predicted fault associated with the set of equipment and the future temporal instance.

3. The method of claim 2, further comprising:
    generating one or more recommended operator actions associated with the predicted fault based at least in part on data associated with one or more previous maintenance actions and the predicted fault, the data comprising at least one of:
        a type of the predicted fault; and
        a frequency of the one or more previous maintenance actions with respect to the type of the predicted fault and a temporal duration;
    wherein the notification comprises an indication of the one or more recommended operator actions.

4. The method of claim 3, further comprising:
    retrieving, from a library, the data associated with the one or more previous maintenance actions,
    wherein the library comprises an indexing of a set of fault types and a set of previous maintenance actions corresponding to the set of fault types.

5. The method of claim 1, wherein:
    the predicted status comprises temporal information associated with the predicted status;
    the output from the machine learning network comprises causal information associated with the predicted status; and
    the notification comprises an indication of the causal information.

6. The method of claim 1, further comprising:
    providing at least the portion of the reference data to the machine learning network,
    wherein the processing of at least the portion of the reference data by the machine learning network comprises generating the predictive model based at least in part on the reference data.

7. The method of claim 1, wherein the reference data comprises at least one of:
    calibration data associated with the set of equipment; and
    a set of operator actions corresponding to a set of status types of the set of equipment.

8. The method of claim 1, wherein:
    the reference data comprises maintenance data associated with the set of equipment; and
    the processing of at least the portion of the reference data by the machine learning network comprises:

applying one or more natural language processing algorithms to the maintenance data; and generating causal information associated with the predicted status, one or more recommended operator actions associated with the predicted status, or both, based at least in part on applying the one or more natural language processing algorithms to the maintenance data.

9. The method of claim 1, wherein the processing of at least the portion of the reference data by the machine learning network comprises:

generating the predictive model based at least in part on calibration data associated with the set of equipment, wherein the calibration data comprises a performance curve associated with the set of equipment.

10. The method of claim 1, wherein:

the set of equipment comprises:
  a first set of equipment of a first equipment type; and
  a second set of equipment of the first equipment type; and the reference data comprises at least one of:
  first reference data associated with the first set of equipment; and
  second reference data associated with the second set of equipment.

11. The method of claim 1, wherein:

the measurement data comprises:
  one or more current measurement values corresponding to one or more parameters associated with the set of equipment; and
  one or more previous measurement values corresponding to the one or more parameters; and the processing of at least the portion of the measurement data by the machine learning network comprises calculating predicted performance data associated with the set of equipment based at least in part on:
  one or more first deviation values between the one or more current measurement values and a threshold value;
  one or more second deviation values between the one or more previous measurement values and the threshold value; or both,
wherein the predicted status is based at least in part on the predicted performance data.

12. The method of claim 11, wherein:

the predicted performance data comprises:
  a predicted value corresponding to the one or more parameters; and
  a deviation value between the predicted value and a threshold value; and the predicted status is based at least in part on the predicted value, the deviation value, or both.

13. The method of claim 9, wherein:

the predicted performance data comprises:
  a set of predicted values corresponding to the one or more parameters, wherein the set of predicted values exceed a threshold value; and the predicted status is based at least in part on a quantity of the predicted values.

14. The method of claim 1, wherein:

the set of equipment comprises one or more positive displacement pumps, one or more centrifugal pumps, or both.

15. The method of claim 1, wherein the measurement data associated with the set of equipment comprises at least one of:

a flow rate associated with the set of equipment;

a rotational speed associated with the set of equipment;
a stroke length associated with the set of equipment; and
a pressure capability associated with of the set of equipment.

16. The method of claim 1, wherein:

the output from the machine learning network comprises ranking information associated with performance of the set of equipment; and the notification comprises an indication of the ranking information associated with the performance of the set of equipment.

17. A device comprising:

a processor; and a memory coupled with the processor, wherein the memory stores data that, when executed by the processor, enables the processor to:

receive measurement data associated with a set of equipment;

provide at least a portion of the measurement data to a machine learning network;

receive an output from the machine learning network in response to the machine learning network processing at least the portion of the measurement data, wherein the processing of at least the portion of the measurement data is based at least in part on a predictive model associated with the set of equipment, and wherein the output comprises an indication of a predicted status of the set of equipment and a future temporal instance associated with the predicted status, wherein the indication of the predicted status comprises an indication of a predicted fault associated with the set of equipment and the future temporal instance;

generate one or more recommended operator actions associated with addressing the predicted fault and the predicted status based at least in part on data associated with one or more previous maintenance actions and the predicted fault, wherein the data associated with one or more previous maintenance actions and the predicted fault comprises at least one of:
  a type of the predicted fault; and
  a frequency of the one or more previous maintenance actions with respect to the type of the predicted fault and a temporal duration; and output a notification in response to the indication of the predicted status comprised in the output from the machine learning network, the notification comprising the indication of the predicted status and an indication of the one or more recommended operator actions.

18. The device of claim 17, wherein receiving the output from the machine learning network is in response to the machine learning network processing at least a portion of reference data associated with the set of equipment, wherein the reference data comprises:
  reference performance data associated with the set of equipment; and
  a set of operating conditions associated with the reference performance data; and wherein the processing of at least the portion of the reference data by the machine learning network comprises generating the predictive model based at least in part on the reference performance data and the set of operating conditions.

19. A system comprising:

a machine learning network;
a processor; and a memory coupled with the processor, wherein the memory stores data that, when executed by the processor, enables the processor to:

receive measurement data associated with a set of equipment, wherein the measurement data comprises: one or more current measurement values corresponding to one or more parameters associated with the set of equipment; and one or more previous measurement values corresponding to the one or more parameters;

provide at least a portion of the measurement data to the machine learning network;

receive an output from the machine learning network in response to the machine learning network processing at least the portion of the measurement data, wherein the processing of at least the portion of the measurement data is based at least in part on a predictive model associated with the set of equipment and comprises calculating predicted performance data associated with the set of equipment based at least in part on:

one or more first deviation values between the one or more current measurement values and a threshold value;

one or more second deviation values between the one or more previous measurement values and the threshold value; or both, and wherein the output from the machine learning network comprises:

a predicted status of the set of equipment, wherein the predicted status is based at least in part on the predicted performance data; and ranking information associated with the set of equipment; and output a notification based at least in part on the output from the machine learning network, wherein the notification comprises:

an indication of the predicted status; and an indication of the ranking information associated with the set of equipment.

20. The system of claim 19, wherein receiving the output from the machine learning network is in response to the machine learning network processing at least a portion of reference data associated with the set of equipment, wherein the reference data comprises:

reference performance data associated with the set of equipment; and a set of operating conditions associated with the reference performance data; and wherein the processing of at least the portion of the reference data by the machine learning network comprises generating the predictive model based at least in part on the reference performance data and the set of operating conditions.

* * * * *